US012361125B2

(12) United States Patent
Anderson et al.

(10) Patent No.: US 12,361,125 B2
(45) Date of Patent: Jul. 15, 2025

(54) DETECTING AN ALGORITHMIC ATTACK AGAINST A HOSTED AI SYSTEM BASED ON INPUTS AND OUTPUTS OF THE HOSTED AI SYSTEM

(71) Applicant: Microsoft Technology Licensing, LLC, Redmond, WA (US)

(72) Inventors: Hyrum Spencer Anderson, Eagle, ID (US); Raja Sekhar Rao Dheekonda, Bellevue, WA (US); William Pearce, Highland, UT (US); Ricky Dee Loynd, Redmond, WA (US); James David McCaffrey, Issaquah, WA (US); Ram Shankar Siva Kumar, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/774,865

(22) Filed: Jul. 16, 2024

(65) Prior Publication Data
US 2024/0378289 A1 Nov. 14, 2024

Related U.S. Application Data

(62) Division of application No. 17/715,014, filed on Apr. 6, 2022, now Pat. No. 12,072,974.

(51) Int. Cl.
*G06F 21/55* (2013.01)
*G06N 5/02* (2023.01)

(52) U.S. Cl.
CPC ............ *G06F 21/554* (2013.01); *G06N 5/02* (2013.01); *G06F 2221/034* (2013.01)

(58) Field of Classification Search
CPC ... G06F 21/554; G06F 2221/034; G06N 5/02; G06N 20/10; G06N 7/01; G06N 3/045; G06N 20/00; H04L 63/1441
See application file for complete search history.

(56) References Cited

U.S. PATENT DOCUMENTS

| 9,985,984 | B1 * | 5/2018 | Chavez | G06N 20/20 |
| 2023/0135755 | A1 * | 5/2023 | Nakar | H04L 63/168 |
| | | | | 726/11 |
| 2024/0031378 | A1 * | 1/2024 | Mendelowitz | G06N 5/01 |

* cited by examiner

Primary Examiner — El Hadji M Sall
(74) Attorney, Agent, or Firm — Wade IP Law PLLC

(57) ABSTRACT

Techniques are described herein that are capable of detecting an algorithmic attack against a hosted artificial intelligence (AI) system based on inputs (e.g., queries) and outputs of the hosted AI system. In a first example, a feature-based classifier model is used to generate a classification score based on features that are derived from numerical representations of the queries and the outputs, and an algorithmic attack is detected based on the classification score being greater than or equal to a score threshold. In a second example, a transformer-based model is used to generate a vector by providing a multivariate time series, which is based on attribute(s) of the inputs and attribute(s) of the outputs, as an input to the transformer-based model, and an algorithmic attack is detected based on a distance between the vector and a point corresponding to a reference vector being less than or equal to a distance threshold.

20 Claims, 14 Drawing Sheets

DETECTING AN ALGORITHMIC ATTACK AGAINST A HOSTED AI SYSTEM BASED ON INPUTS AND OUTPUTS OF THE HOSTED AI SYSTEM

CROSS-REFERENCE TO RELATED APPLICATION(S)

This application is a division of U.S. patent application Ser. No. 17/715,014, filed Apr. 6, 2022 and entitled "Detecting an Algorithmic Attack Against a Hosted AI System Based on Inputs and Outputs of the Hosted AI System," the entirety of which is incorporated herein by reference.

BACKGROUND

Widespread adoption of artificial intelligence has brought significant value to many industries, resulting in an increased incentive for malicious entities to exploit the artificial intelligence. For instance, artificial intelligence systems, especially those hosted in the cloud (i.e., hosted artificial intelligence systems), can be targeted by algorithmic attacks. An algorithmic attack is an attack that is performed (e.g., manually or automatically) in accordance with an algorithm. For example, the algorithmic attack can be an evasion attack, an inversion attack, or an extraction attack. An evasion attack is an algorithmic attack that is configured to corrupt, confuse, or evade the artificial intelligence system. An inversion attack is an algorithmic attack that is configured to utilize strategically selected queries to discover private training data that is used to train the artificial intelligence system. An extraction attack is an algorithmic attack that is configured to steal the artificial intelligence system. Hosted artificial intelligence systems traditionally have little to no protection against such algorithmic attacks.

SUMMARY

Various approaches are described herein for, among other things, detecting an algorithmic attack against a hosted artificial intelligence system based on (e.g., based at least in part on) inputs and outputs of the hosted artificial intelligence system. Accordingly, the detection may be based on behavior of the hosted artificial intelligence system. Artificial intelligence simulates intelligent behavior in processing system(s). For instance, the artificial intelligence may be configured to perceive or infer information and to apply the information toward adaptive behavior(s) within an environment or a context. An artificial intelligence system is a system that implements artificial intelligence. A hosted artificial intelligence system is an artificial intelligence system that is hosted in the cloud. Accordingly, the hosted artificial intelligence system may be referred to as a cloud-based artificial intelligence system.

An algorithmic attack is an attack that is performed (e.g., manually or automatically) in accordance with an algorithm. For example, the algorithm may be a finite sequence of well-defined instructions that are used to perform the attack. In accordance with this example, at least some of the instructions of the algorithm may be executed iteratively to achieve the goal of the attack.

In a first example approach, features, which are associated with a known type of algorithmic attack, are derived from numerical representations of respective queries that are received by a hosted artificial intelligence system and outputs that result from processing of the respective queries by the hosted artificial intelligence system. A feature-based classifier model is used to generate a classification score, which indicates a likelihood that at least a portion of the queries corresponds to the known type of algorithmic attack, by providing the derived features as inputs to the feature-based classifier model. The classification score is compared to a score threshold that is associated with the known type of algorithmic attack. An algorithmic attack is detected based at least in part on the classification score being greater than or equal to the score threshold that is associated with the known type of algorithmic attack.

In a second example approach, a transformer-based model is used to generate a vector, which summarizes a plurality of queries that are received by a hosted artificial intelligence system and a plurality of outputs that result from processing of the plurality of respective queries by the hosted artificial intelligence system, by providing a multivariate time series as an input to the transformer-based model. The multivariate time series includes a plurality of elements. Each element is based at least in part on a pairwise distance between a numerical representation of a respective query of the plurality of queries and a numerical representation of a previous query that temporally precedes the respective query and further based at least in part on one or more attributes of the output that results from processing the respective query. A determination is made whether a distance between the vector and a point corresponding to a reference vector that is associated with a known type of algorithmic attack is less than or equal to a distance threshold. An algorithmic attack is detected based at least in part on the distance between the vector and the point being less than or equal to the distance threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 2:
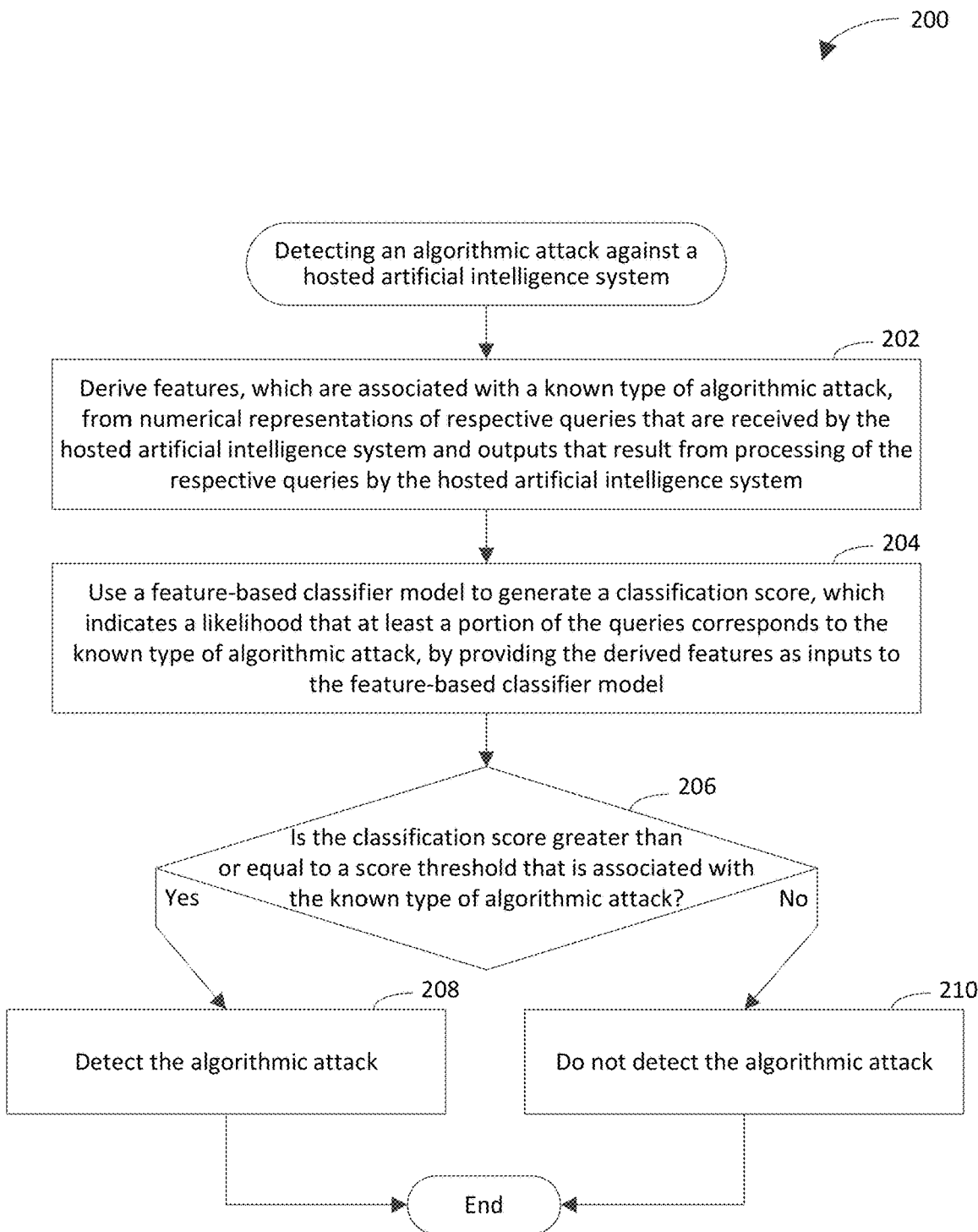
FIG. 2 depicts a flowchart of an example method for detecting an algorithmic attack against a hosted artificial intelligence system based on inputs and outputs of the hosted artificial intelligence system in accordance with an embodiment.

FIGS. 4, 6-10, and 12 depict flowcharts of example methods for detecting the features mentioned in the flowchart of FIG. 2 in accordance with embodiments.

Figure 3:
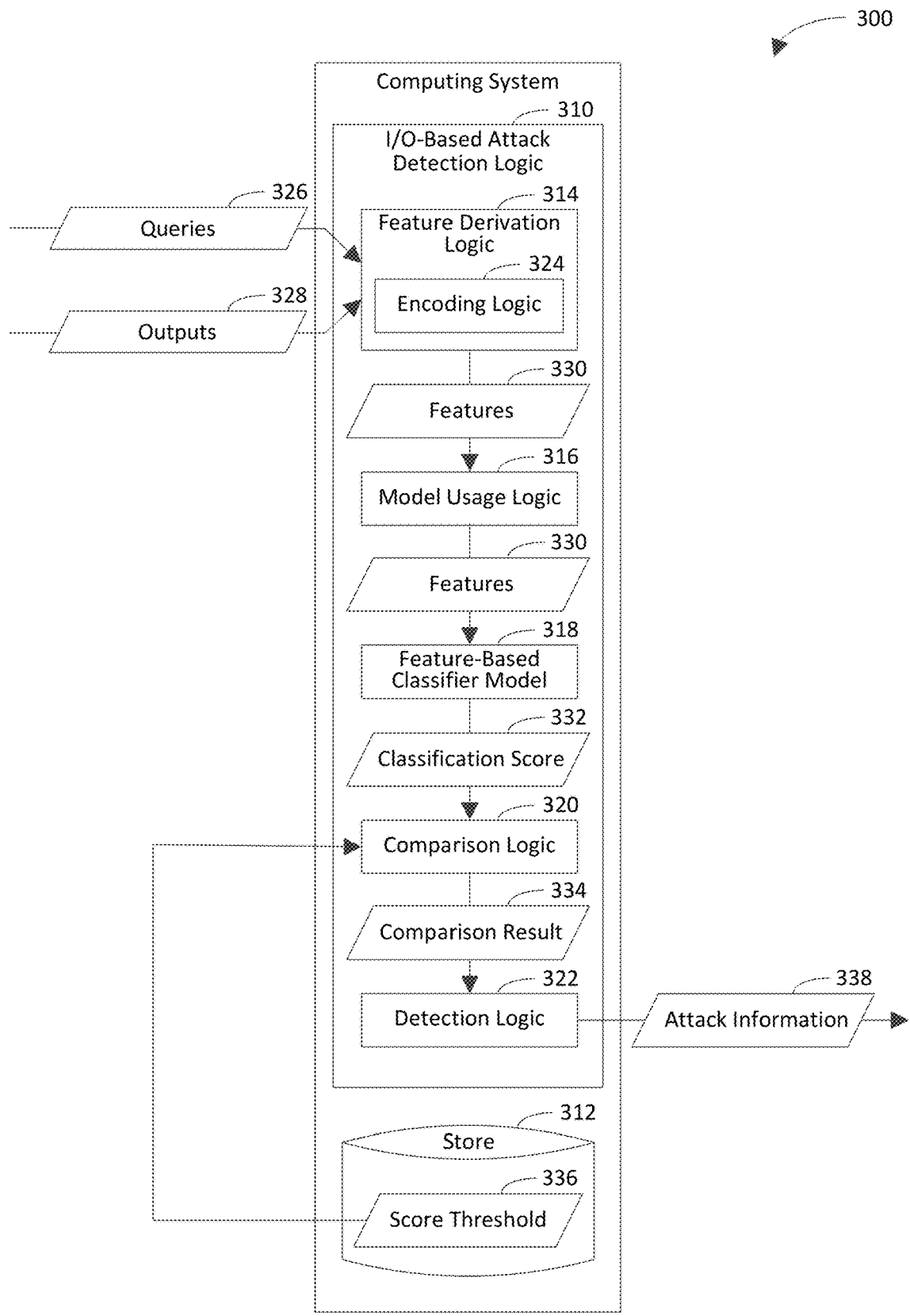
FIG. 3 is a block diagram of an example computing system in accordance with an embodiment.
Figure 5:
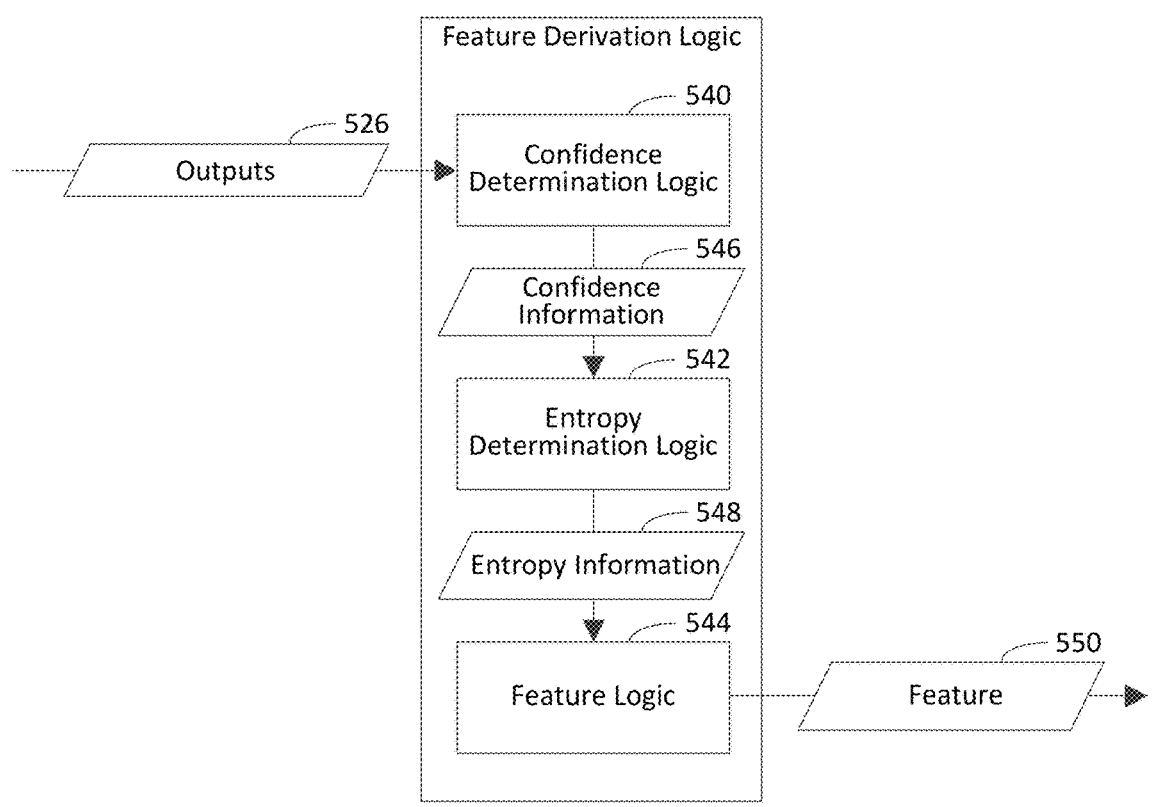
Figure 11:
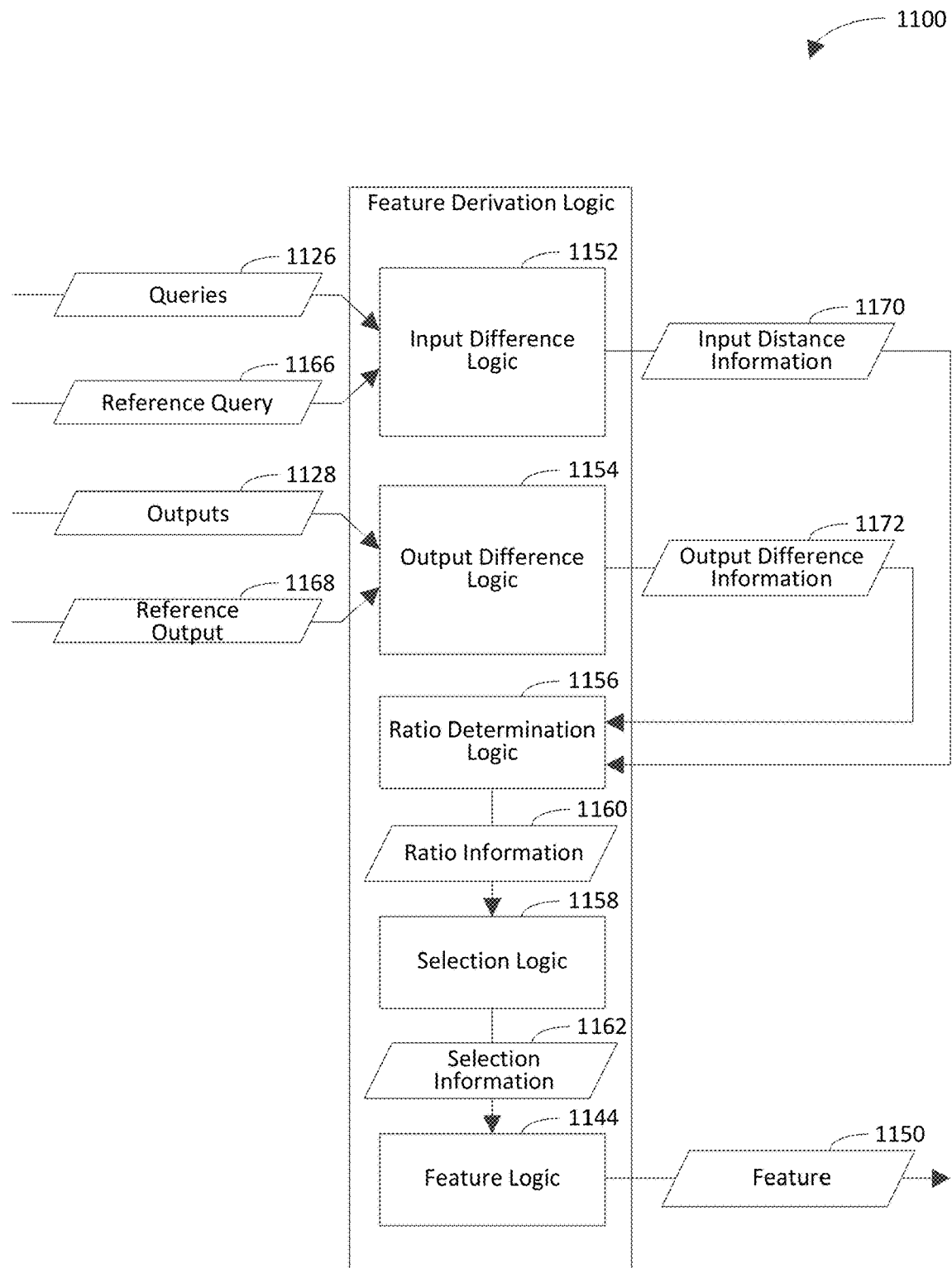
Figure 13:
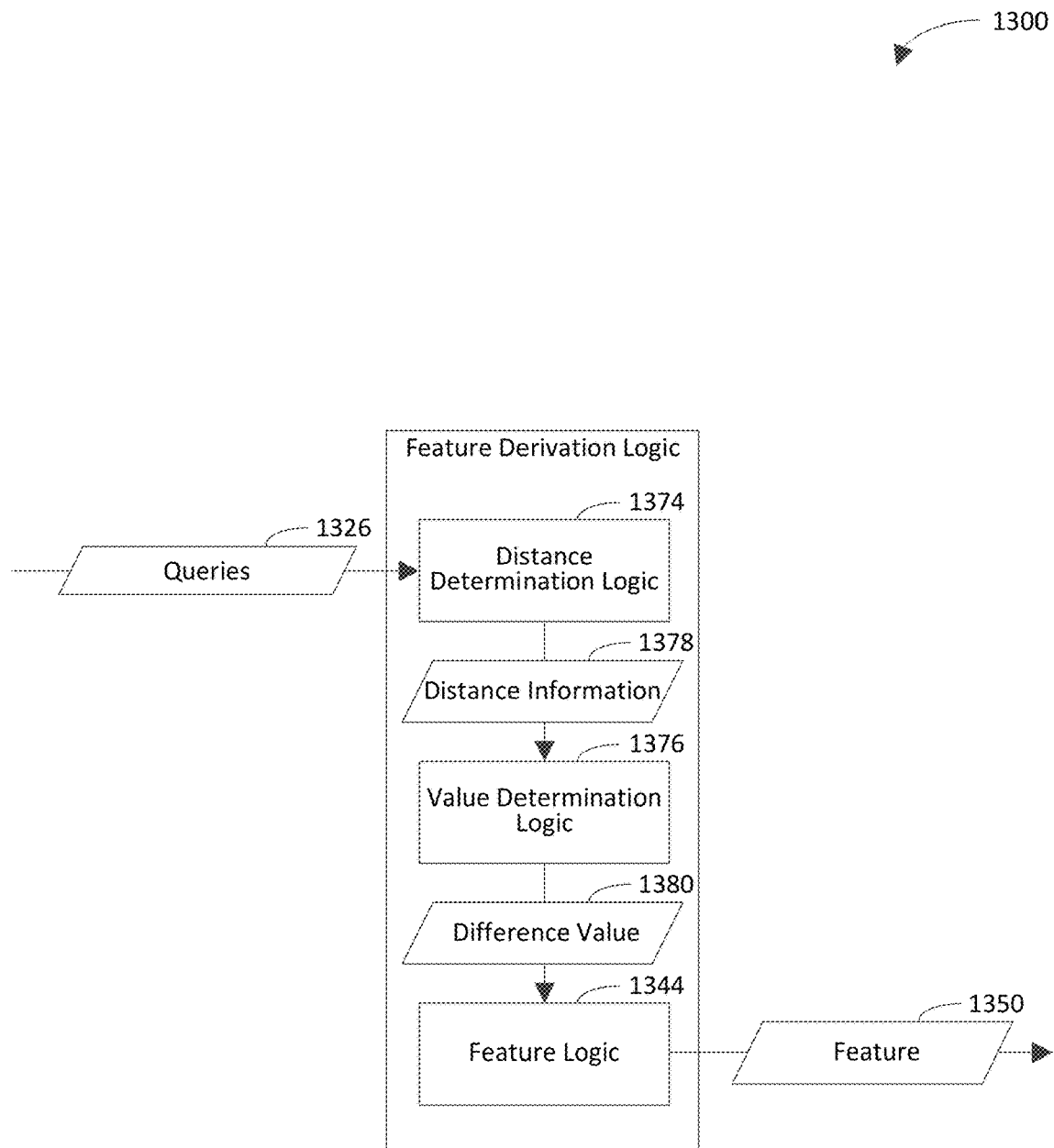

FIGS. 5, 11, and 13 are block diagrams of example implementations of the feature derivation logic shown in FIG. 3 in accordance with an embodiment.

Figure 14:
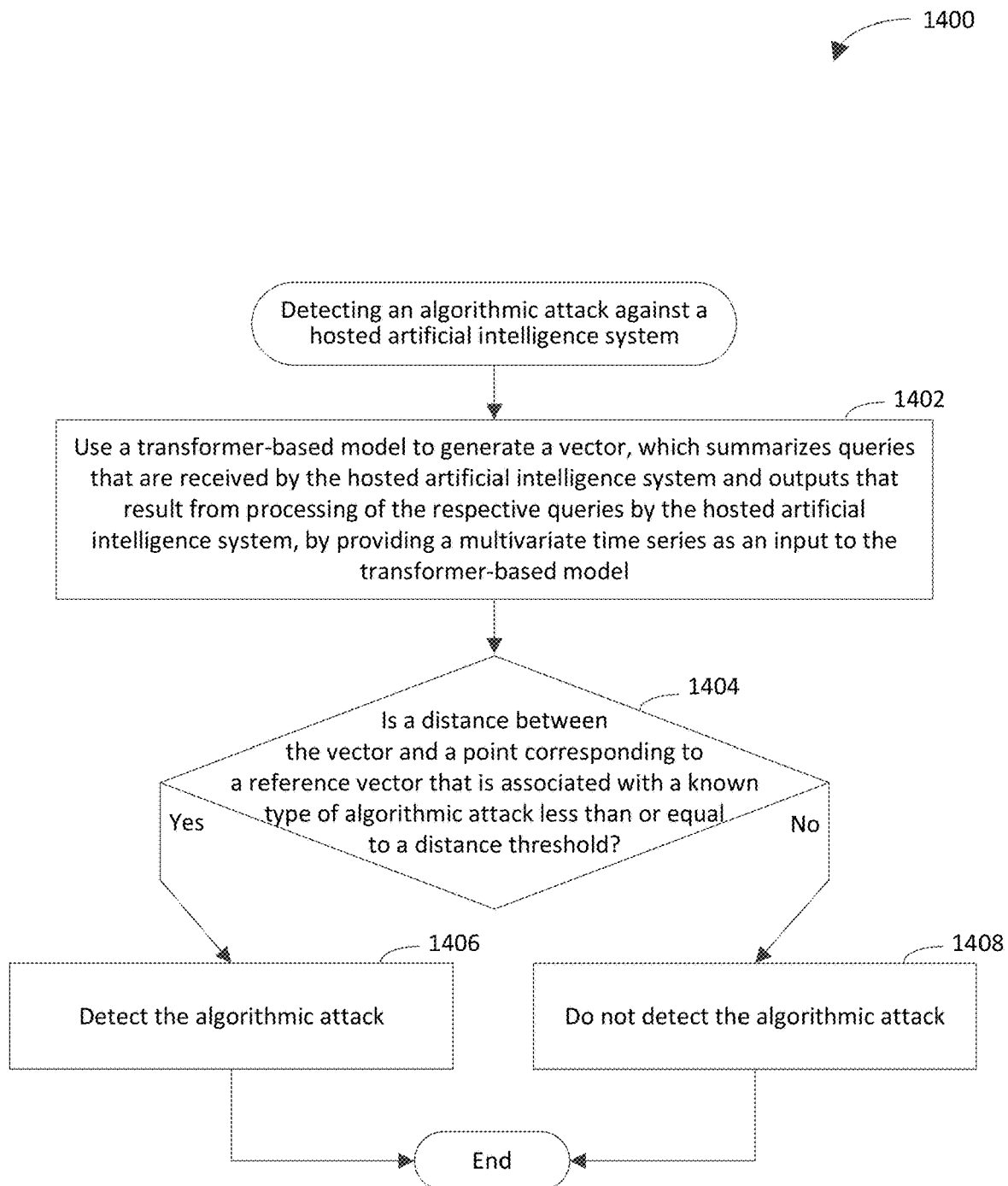

FIG. 14 depicts a flowchart of another example method for detecting an algorithmic attack against a hosted artificial intelligence system based on inputs and outputs of the hosted artificial intelligence system in accordance with an embodiment.

Figure 15:
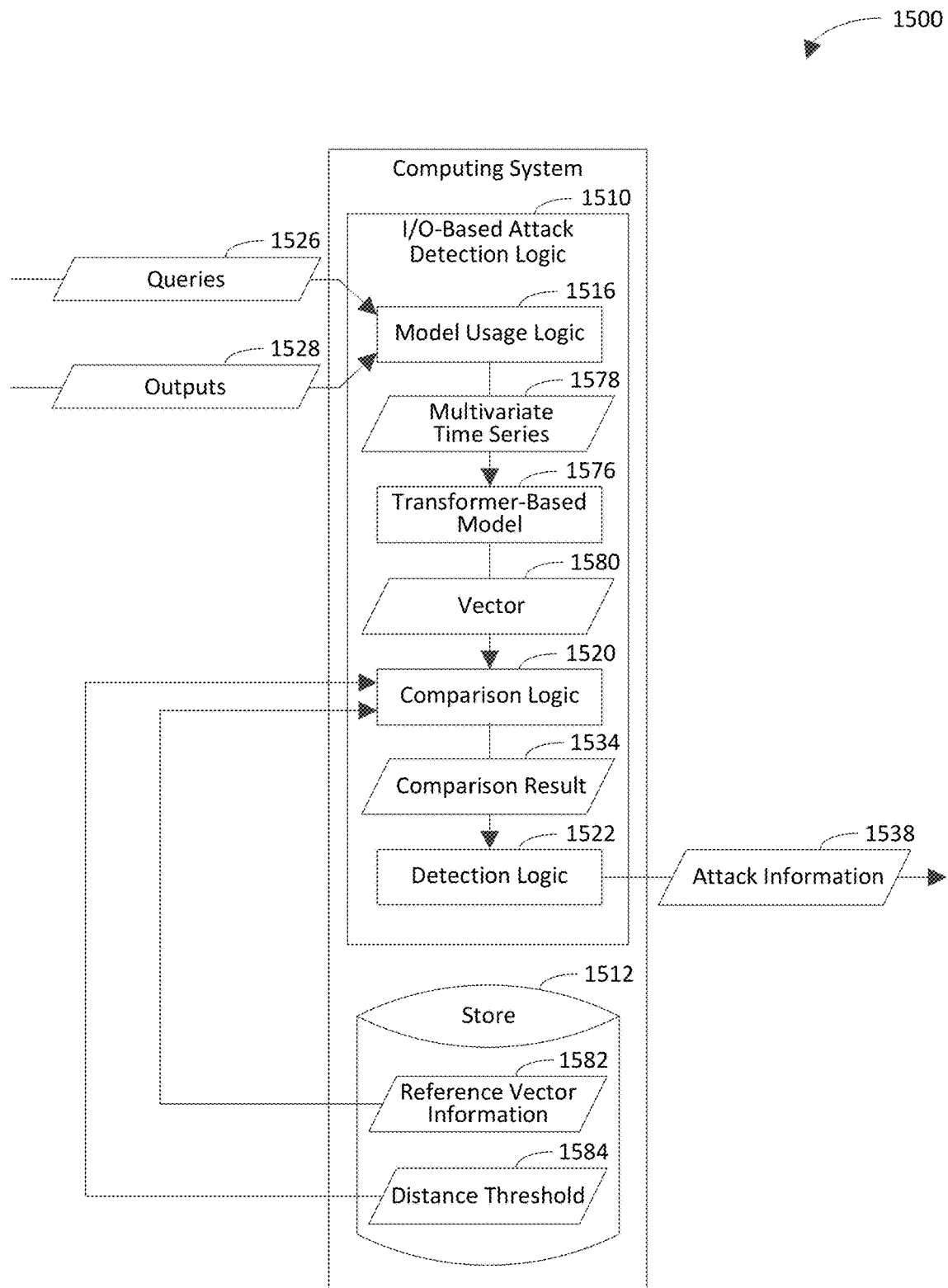

FIG. 15 is a block diagram of another example computing system in accordance with an embodiment.

Figure 16:
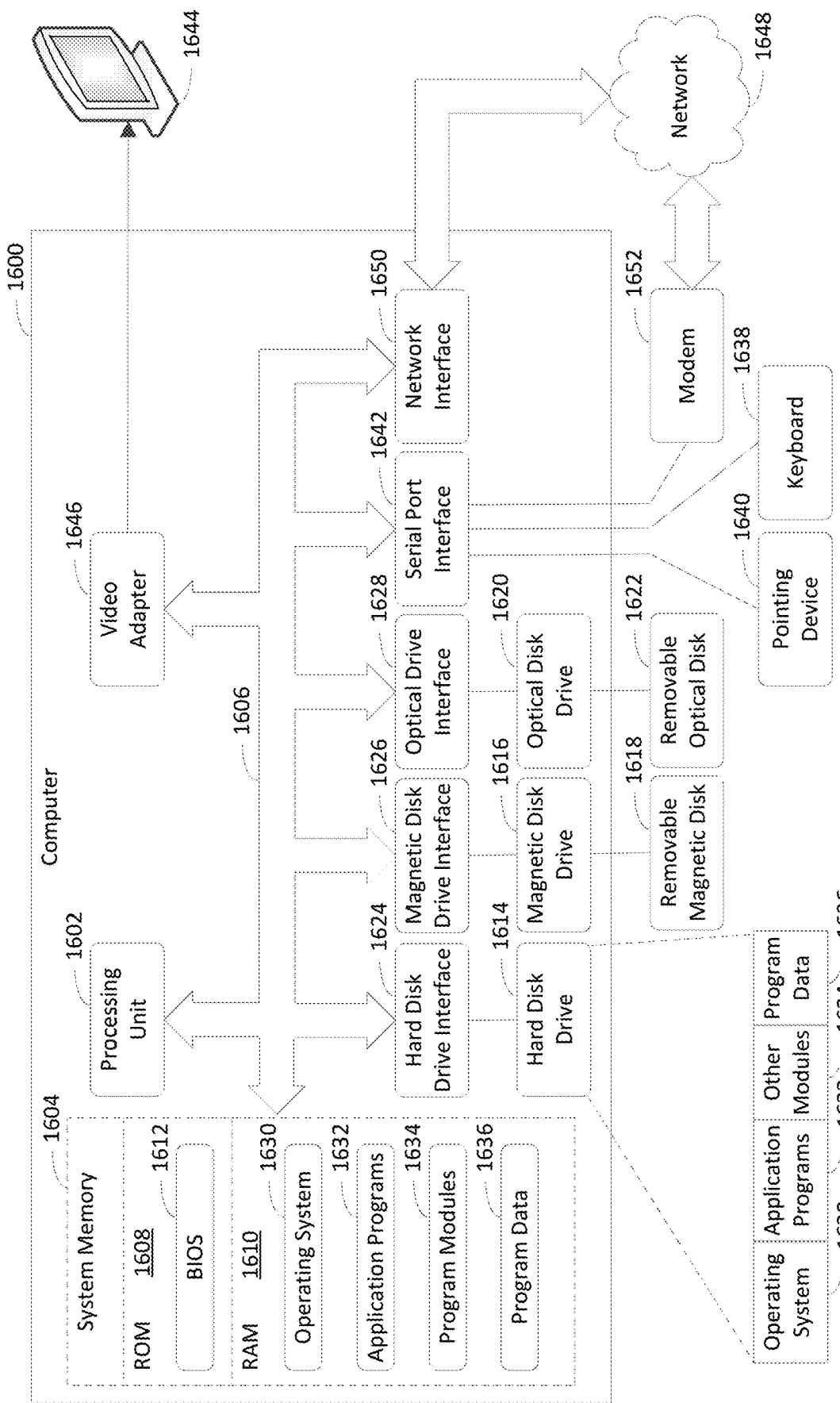

FIG. 16 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of detecting an algorithmic attack against a hosted artificial intelligence system based on (e.g., based at least in part on) inputs and outputs of the hosted artificial intelligence system. Accordingly, the detection may be based on behavior of the hosted artificial intelligence system. Artificial intelligence simulates intelligent behavior in processing system(s). For instance, the artificial intelligence may be configured to perceive or infer information and to apply the information toward adaptive behavior(s) within an environment or a context. An artificial intelligence system is a system that implements artificial intelligence. A hosted artificial intelligence system is an artificial intelligence system that is hosted in the cloud. Accordingly, the hosted artificial intelligence system may be referred to as a cloud-based artificial intelligence system.

An algorithmic attack is an attack that is performed (e.g., manually or automatically) in accordance with an algorithm. For example, the algorithm may be a finite sequence of well-defined instructions that are used to perform the attack. In accordance with this example, at least some of the instructions of the algorithm may be executed iteratively to achieve the goal of the attack.

Example techniques described herein have a variety of benefits as compared to conventional techniques for detecting an algorithmic attack. For instance, the example techniques may be capable of increasing security of a hosted artificial intelligence system and/or a computing system that hosts the artificial intelligence system. In one aspect, the example techniques may reduce a likelihood of an algorithmic attack against a hosted artificial intelligence system to corrupt, confuse, or evade the hosted artificial intelligence system. In another aspect, the example techniques may reduce a likelihood of an algorithmic attack against a hosted artificial intelligence system to discover private training data that is used to train the artificial intelligence system. In yet another aspect, the example techniques may reduce a likelihood of an algorithmic attack against a hosted artificial intelligence system to steal the hosted artificial intelligence system.

The example techniques may increase security of a user of a hosted artificial intelligence system. For instance, the example techniques may preserve privacy of the user (e.g., by storing numerical representations of queries that are received from the user by the artificial intelligence system, rather than storing the raw queries). Accordingly, the example techniques may increase a user experience of the user.

The example techniques may reduce an amount of time and/or resources (e.g., processor cycles, memory, network bandwidth) that is consumed to detect an algorithmic attack against a hosted artificial intelligence system. For instance, the example techniques may reduce an amount of data that is stored in logs regarding the hosted artificial intelligence system (e.g., by storing numerical representations of queries that are received by the hosted artificial intelligence system in lieu of the raw queries). By using inputs and outputs of the hosted artificial intelligence system to detect an algorithmic attack, the example techniques may increase precision, accuracy, speed, and/or efficiency of the detection. Accordingly, additional time and resources that would have been consumed to detect the algorithmic attack can be avoided.

By increasing the precision, accuracy, speed, and/or efficiency of the detection, the example techniques may reduce a number of remedial actions that a computing system performs to remediate such an attack. For instance, if the algorithmic attack is detected before the algorithmic attack is able to achieve its goal, a need to perform the remedial actions may be obviated. Accordingly, the example techniques may be capable of reducing an amount of time and/or resources that is consumed to perform such remedial actions.

By reducing the amount of time and/or resources that are consumed to detect and/or remediate an algorithmic attack, the example techniques may increase efficiency of a computing system that is configured to detect and/or remediate the algorithmic attack (e.g., the computing system that hosts the artificial intelligence system). The example techniques may increase efficiency of an administrator of the hosted artificial intelligence system. For instance, using inputs and outputs of the hosted artificial intelligence system to detect the algorithmic attack may reduce an amount of time that the administrator spends to detect and/or remediate the algorithmic attack.

Figure 1:
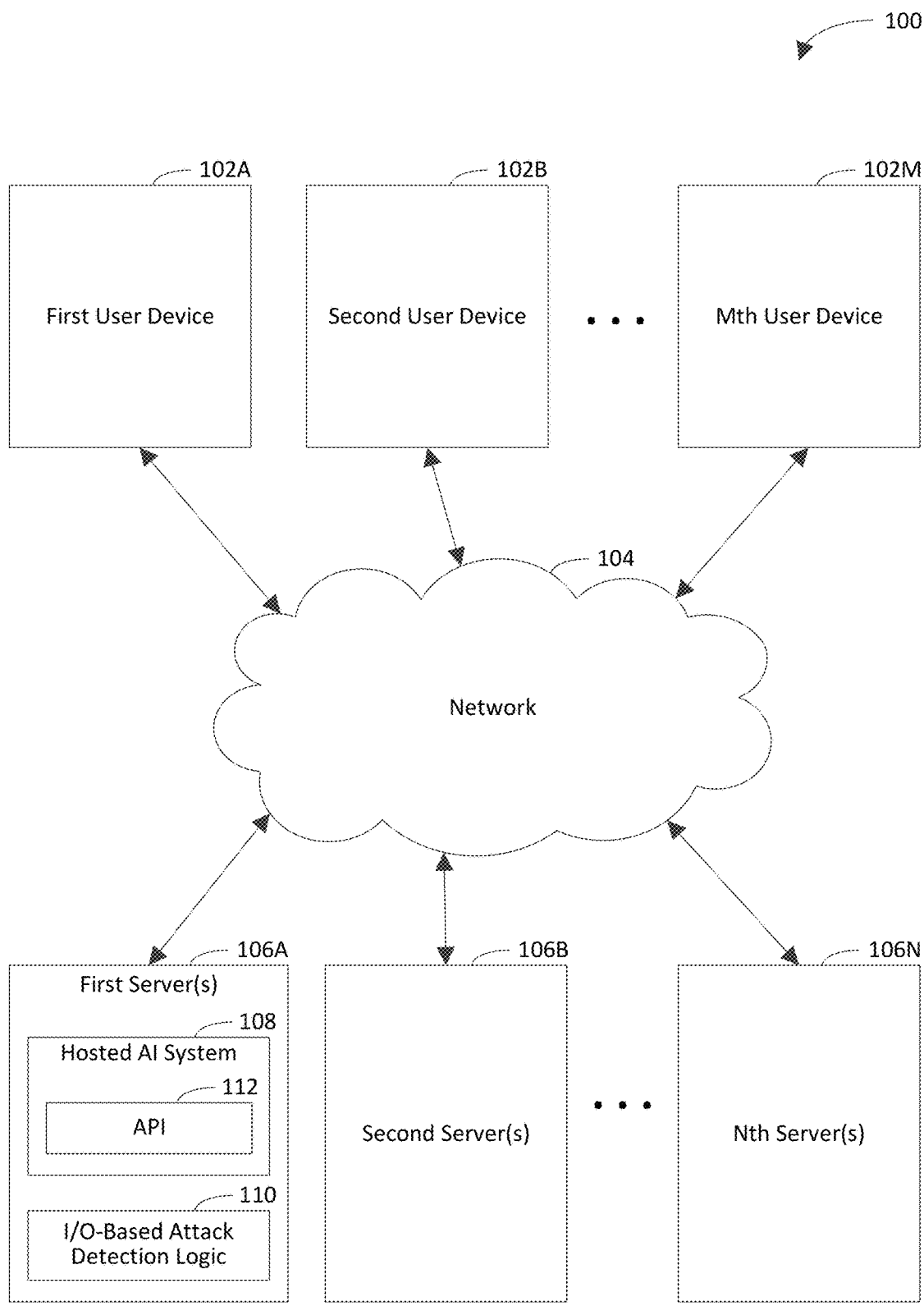
FIG. 1 is a block diagram of an example I/O-based attack detection system in accordance with an embodiment.

FIG. 1 is a block diagram of an example I/O-based attack detection system 100 in accordance with an embodiment. Generally speaking, the I/O-based attack detection system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the I/O-based attack detection system 100 detects an algorithmic attack against a hosted artificial intelligence (AI) system 108 based on (e.g., based at least in part on) inputs and outputs of the hosted AI system 108. Detail regarding techniques for detecting an algorithmic attack against a hosted artificial intelligence system based on inputs and outputs of the hosted artificial intelligence system is provided in the following discussion.

As shown in FIG. 1, the I/O-based attack detection system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests (e.g., queries) to the servers 106A-106N for requesting information stored on (or otherwise accessible via) the servers 106A-106N. For example, a user may initiate a request for executing a computer program (e.g., an application) using a client (e.g., a Web browser, Web crawler, or other type of client) deployed on a user device 102 that is owned by or otherwise accessible to the user. In accordance with this example, the user may initiate one or more queries to be processed by the hosted AI system 108. Each query may solicit a response (a.k.a. output) from the hosted AI system 108. For instance, each query may solicit the hosted AI system 108 to classify the query among a plurality of potential outputs. In response to each query, the user may receive an output, which is selected by the hosted AI system 108 from the potential outputs, at the first user device 102A. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. Any one or more of the computer programs may be a cloud computing service. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc. In accordance with some example embodiments, the servers 106A-106N are configured to host respective Web sites, so that the Web sites are accessible to users of the I/O-based attack detection system 100.

The first server(s) 106A are shown to include the hosted AI system 108 and input/output-based (I/O-based) attack detection logic 110 for illustrative purposes. It may be said that the first server(s) 106A host the hosted AI system 108. The hosted AI system 108 implements artificial intelligence, which is configured to generate outputs based on received inputs (e.g., queries). For instance, the hosted AI system 108 is capable of using the artificial intelligence to classify queries that are received from the user devices 102A-102M among a plurality of potential outputs. For example, the hosted AI system 108 may analyze each query that is received from a user device to determine a potential output from the plurality of potential outputs that most closely corresponds to (e.g., matches) the query. In accordance with this example, the hosted AI system 108 may select the potential output that most closely corresponds to the query to be provided as an output to the user device in response to the query.

It will be recognized that the hosted AI system 108 uses machine learning to perform at least some of its operations. For instance, the hosted AI system 108 may use machine learning to develop and refine a classification algorithm that is used by the hosted AI system 108 to classify the queries that are received from the user device 102A-102M among the plurality of potential outputs.

The hosted AI system 108 may use a neural network to perform the machine learning to classify the queries among the plurality of potential outputs. Examples of a neural network include but are not limited to a feed forward neural network and a long short-term memory (LSTM) neural network. A feed forward neural network is an artificial neural network for which connections between units in the neural network do not form a cycle. In an example embodiment, the hosted AI system 108 employs a feed forward neural network to train a machine learning model that is used to determine ML-based confidences. Such ML-based confidences may be used to determine likelihoods that events will occur. For example, such ML-based confidences may be associated with the plurality of potential outputs (e.g., potential classifications) for each query that is received from a user device. In accordance with this example, for each query, the hosted AI system 108 may assign ML-based confidences to the respective potential outputs to indicate respective likelihoods that the query corresponds to the respective potential outputs.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In an example, the LSTM neural network may be capable of remembering relationships between features, such as queries, potential outputs, outputs that are selected from the potential outputs, and ML-based confidences that are derived therefrom.

The hosted AI system 108 may include training logic and inference logic. The training logic is configured to train a machine learning algorithm that the inference logic uses to determine (e.g., infer) the ML-based confidences. For instance, the training logic may provide sample queries, sample potential outputs, sample outputs that are selected from the potential outputs, and sample confidences as inputs to the algorithm to train the algorithm. The sample data may be labeled. The machine learning algorithm may be configured to derive relationships between the features (e.g., queries, potential outputs, and outputs that are selected from the potential outputs) and the resulting ML-based confidences. The inference logic is configured to utilize the machine learning algorithm, which is trained by the training logic, to determine the ML-based confidence when the features are provided as inputs to the algorithm.

The hosted AI system 108 is shown to include an application programming interface (API) 112 for illustrative purposes. An API is a connection between one or more computing systems (e.g., computers) and/or one or more computer programs. The API 112 enables communication between the user devices 102A-102M and the hosted AI system 108. For instance, the user devices 102A-102M may call the API 112 to provide queries to the hosted AI system 108, and the hosted AI system 108 may respond to the queries by using the API 112 to provide corresponding outputs to the user devices 102A-102M from which the queries were received. The API 112 may be a representational state transfer (REST) API, though the example embodiments are not limited in this respect. Algorithmic attacks that attack the hosted AI system behind the API 112 may be referred to as "closed-box" attacks or "black-box" attacks.

The I/O-based attack detection logic 110 is configured to detect an algorithmic attack against the hosted AI system 108 based on inputs and outputs of the hosted AI system 108. For instance, the I/O-based attack detection logic 110 may intercept queries that are sent from the user devices 102A-102M to the hosted AI system 108 and corresponding outputs that are provided by the hosted AI system 108 to the user devices 102A-102M for purposes of detecting the algorithmic attack.

In a first example approach, the I/O-based attack detection logic 110 derives features, which are associated with a known type of algorithmic attack, from numerical representations of respective queries that are received by the hosted AI system 108 and outputs that result from processing of the respective queries by the hosted AI system 108. For instance, the features may be derived based on Gaussian projections of the queries and the outputs. In an aspect, the numerical representations of the queries and the outputs may be stored in logs, and the I/O-based attack detection logic 110 may extract the features from the logs. The I/O-based attack detection logic 110 uses a feature-based classifier model to generate a classification score, which indicates a likelihood that at least a portion of the queries corresponds to the known type of algorithmic attack, by providing the derived features as inputs to the feature-based classifier model. The I/O-based attack detection logic 110 compares the classification score to a score threshold that is associated with the known type of algorithmic attack. The I/O-based attack detection logic 110 detects the algorithmic attack based at least in part on the classification score being greater than or equal to the score threshold that is associated with the known type of algorithmic attack.

In a second example approach, the I/O-based attack detection logic 110 uses a transformer-based model to generate a vector, which summarizes queries that are received by the hosted AI system 108 and outputs that result from processing the respective queries by the hosted AI system 108, by providing a multivariate time series as an input to the transformer-based model. The multivariate time series includes multiple elements. Each element is based at least in part on a pairwise distance between a numerical representation of a respective query and a numerical representation of a previous query that temporally precedes the respective query and further based at least in part on attribute(s) of the output that results from processing the respective query. In an aspect, the numerical representations of the queries and the outputs may be stored in logs, and the I/O-based attack detection logic 110 may generate the multivariate time series from the logs. The I/O-based attack detection logic 110 determines whether a distance between the vector and a point corresponding to a reference vector that is associated with a known type of algorithmic attack is less than or equal to a distance threshold. The I/O-based attack detection logic 110 detects the algorithmic attack based at least in part on the distance between the vector and the point being less than or equal to the distance threshold.

The I/O-based attack detection logic 110 may be implemented in various ways to detect an algorithmic attack against the hosted AI system 108 based on the inputs and outputs of the hosted AI system 108, including being implemented in hardware, software, firmware, or any combination thereof. For example, the I/O-based attack detection logic 110 may be implemented as computer program code configured to be executed in one or more processors. In another example, at least a portion of the I/O-based attack detection logic 110 may be implemented as hardware logic/electrical circuitry. For instance, at least a portion of the I/O-based attack detection logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The I/O-based attack detection logic 110 may be partially or entirely incorporated in the hosted AI system 108 and/or a cloud computing service, though the example embodiments are not limited in this respect. For instance, the hosted AI system 108 may be a cloud computing service.

The I/O-based attack detection logic 110 is shown to be incorporated in the first server(s) 106A for illustrative purposes and is not intended to be limiting. It will be recognized that the I/O-based attack detection logic 110 (or any portion(s) thereof) may be incorporated in any one or more of the user devices 102A-102M. For example, client-side aspects of the I/O-based attack detection logic 110 may be incorporated in one or more of the user devices 102A-102M (e.g., to log appropriate information and/or to guarantee privacy of query data), and server-side aspects of I/O-based attack detection logic 110 may be incorporated in the first server(s) 106A. For instance, the client-side aspects of the I/O-based attack detection logic 110 may be incorporated in user device(s) in the form of plugin(s). A plugin may have any of a variety of forms. For instance, a plugin may be implemented as a Python decorator. In another example, the I/O-based attack detection logic 110 may be distributed among the user devices 102A-102M. In yet another example, the I/O-based attack detection logic 110 may be incorporated in a single one of the user devices 102A-102M. In another example, the I/O-based attack detection logic 110 may be distributed among the server(s) 106A-106N. In still another example, the I/O-based attack detection logic 110 may be incorporated in a single one of the servers 106A-106N.

FIG. 2 depicts a flowchart 200 of an example method for detecting an algorithmic attack against a hosted artificial intelligence system based on inputs and outputs of the hosted artificial intelligence system in accordance with an embodiment. Flowchart 200 may be performed by the first server(s) 106A shown in FIG. 1, for example. For illustrative purposes, flowchart 200 is described with respect to computing system 300 shown in FIG. 3, which is an example implementation of the first server(s) 106A. As shown in FIG. 3, the computing system 300 includes I/O-based attack detection logic 310 and a store 312. The I/O-based attack detection logic 310 includes feature derivation logic 314, model usage logic 316, a feature-based classifier model 318, comparison logic 320, and detection logic 322. The store 312 may be any suitable type of store. One type of store is a database. For instance, the store 312 may be a relational database, an entity-relationship database, an object database, an object relational database, an extensible markup language (XML) database, etc. The store 312 is shown to store a score threshold 336 for non-limiting, illustrative purposes. Further structural and operational embodiments will be apparent to persons skilled in the relevant art(s) based on the discussion regarding flowchart 200.

As shown in FIG. 2, the method of flowchart 200 begins at step 202. In step 202, features are derived from numerical representations of respective queries that are received by the hosted artificial intelligence system and outputs that result from processing of the respective queries by the hosted artificial intelligence system. The features may take into consideration other factors in addition to the queries and the outputs. Examples of such a factor include but are not limited to a timestamp associated with each query, a client identifier (ID) indicating a client device or user from which the query is received, and a model ID uniquely identifying the hosted AI system. For instance, such factors (and the numerical representations of the queries and the outputs) may be stored in logs and retrieved from the logs for purposes of deriving the features. The features are associated with a known type of algorithmic attack. For instance, the features may be derived based at least in part on the features being associated with the known type of algorithmic attack. The queries may be associated with a common (e.g., same) user session. For instance, the queries may define the user session. A user session is a temporary and interactive exchange of information between the hosted artificial intelligence system and a user device from which the queries are received by the hosted artificial intelligence system. The user session may begin at a first time instance at which a temporally first query of the queries is initiated by the user device and end at a second time instance at which a temporally last output of the outputs is received at the user device. In an example implementation, the feature derivation logic 314 derives features 330, which are associated with the known type of algorithmic attack, from numerical representations of respective queries 326 that are received by the hosted artificial intelligence system and outputs 328 that result from processing of the respective queries 326 by the hosted artificial intelligence system.

Deriving the features at step 202 may increase accuracy and/or precision of detecting the algorithmic attack by using both inputs (e.g., numerical representations of queries) and outputs of the hosted artificial intelligence system. By using numerical representations of the queries, step 202 may increase security of the hosted artificial intelligence system and/or increase privacy of a user who initiates the queries. By using features that are associated with a known type of algorithmic attack, step 202 may reduce an amount of time and/or resources that is consumed by a computing system to process the features. Deriving the features at step 202 may increase efficiency of the computing system.

The features may be derived at step 202 in any of a variety of ways. Some features may be specific to the known type of algorithmic attack. Other features may be associated with a variety of types of algorithmic attacks. In an example embodiment, deriving the features at step 202 includes spectrally analyzing the outputs that result from processing of the respective queries by the hosted artificial intelligence system to determine that the outputs exhibit periodicity. In accordance with this embodiment, deriving the features at step 202 further includes deriving a first feature based at least in part on the outputs exhibiting periodicity. In further accordance with this embodiment, the outputs exhibiting periodicity weighs in favor of increasing the classification score.

Embodiments in which the known type of algorithmic attack is an inversion attack are referred to herein as "inversion embodiments." In a first inversion embodiment, deriving the features at step 202 includes deriving a first feature based at least in part on a standard deviation of a Gaussian distribution that is defined by the numerical representations of the respective queries. The first feature derived in accordance with the first inversion embodiment may be referred to as an "inverse standard deviation test" or a "Kolmogorov-Smirnov test." The inverse standard deviation test is relatively large for finite differencing when the algorithmic attack uses a relatively low standard deviation for model probing. The Kolmogorov-Smirnov test indicates whether Gaussian or uniform perturbations are used for gradient estimation. In accordance with the first inversion embodiment, the standard deviation being relatively low weighs in favor of increasing the classification score, and the standard deviation being relatively high weighs against increasing the classification score.

In a second inversion embodiment, deriving the features at step 202 includes determining an entropy associated with the numerical representations of the respective queries. In accordance with the second inversion embodiment, deriving the features at step 202 includes deriving a first feature based at least in part on the entropy. For example, the first feature derived in accordance with the second inversion embodiment may be referred to as a "input information." In accordance with this example, the input information may indicate entropy under a Gaussian assumption on the queries, which may discriminate human interaction from algorithmic interaction. In further accordance with the second inversion embodiment, a relatively low entropy weighs in favor of increasing the classification score, and a relative high entropy weighs against increasing the classification score.

Figure 4:
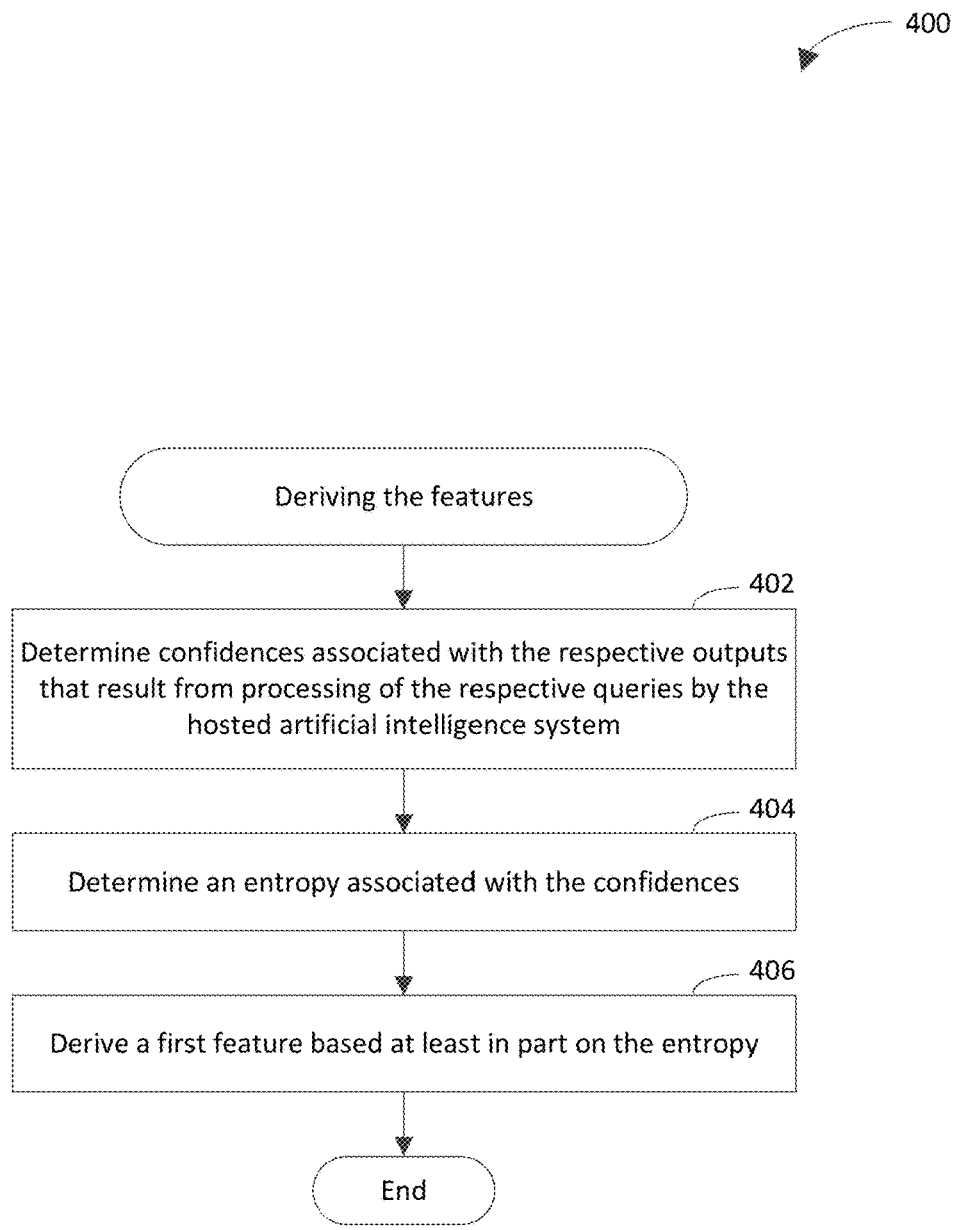

In a third inversion embodiment, deriving the features at step 202 includes one or more of the steps shown in flowchart 400 of FIG. 4. For example, a feature derived using the steps shown in flowchart 400 also may be referred to as a "output information." In accordance with this example, the output information may indicate entropy under a Gaussian assumption on the outputs to discriminate human interaction from algorithmic interaction. Flowchart 400 may be performed by the feature derivation logic 314 shown in FIG. 3, for example. For illustrative purposes, flowchart 400 is described with respect to feature derivation logic 500 shown in FIG. 5, which is an example implementation of the feature derivation logic 314. As shown in FIG. 5, the feature derivation logic 500 includes confidence determination logic 540, entropy determination logic 542, and feature logic 544. Further structural and operational embodiments will be apparent to persons skilled in the relevant art(s) based on the discussion regarding flowchart 400.

As shown in FIG. 4, the method of flowchart 400 begins at step 402. In step 802, confidences associated with the respective outputs that result from processing of the respective queries by the hosted artificial intelligence system are determined. For instance, a confidence associated with an output may be a confidence in a classification of the output (e.g., a confidence that the output is to be classified in a designated class). In an example implementation, the confidence determination logic 540 determines confidences associated with the respective outputs 526 that result from processing of the respective queries by the hosted artificial intelligence system. The confidence determination logic 540 may generate confidence information 546 to indicate the confidences.

At step 404, an entropy associated with the confidences is determined. In an example implementation, the entropy determination logic 542 determines the entropy associated with the confidences. For instance, the entropy determination logic 542 may analyze a distribution of the confidences, as indicated by the confidence information 546, to determine the entropy. The entropy determination logic 542 may generate entropy information 548 to indicate the entropy.

At step 406, a first feature is derived based at least in part on the entropy. In an example implementation, the feature logic 544 derives a feature 550 based at least in part on the entropy. For instance, the feature logic 544 may analyze the entropy information 548 to determine the entropy.

In accordance with the third inversion embodiment, a relatively low entropy weighs in favor of increasing the classification score, and a relative high entropy weighs against increasing the classification score.

Figure 6:
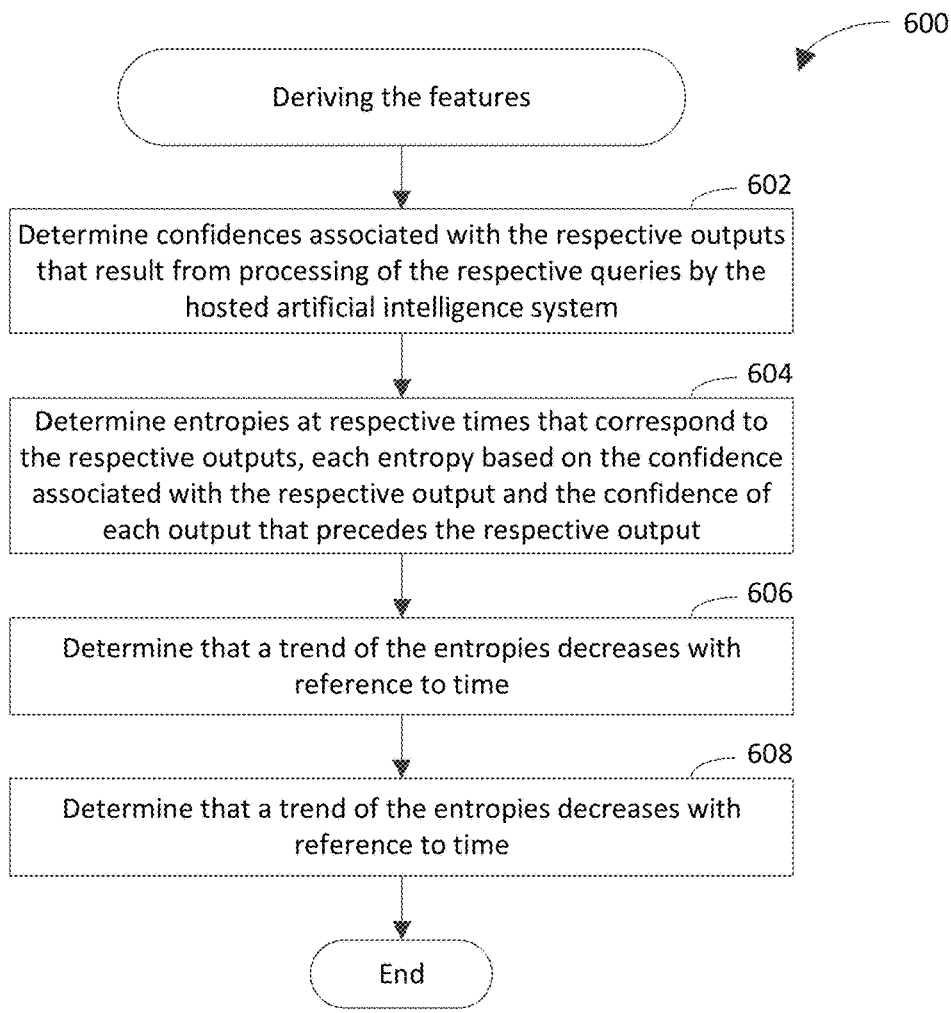

In a fourth inversion embodiment, deriving the features at step 202 includes one or more of the steps shown in flowchart 600 of FIG. 6. For example, a feature derived using the steps shown in flowchart 600 may be referred to as a "model entropy score." Flowchart 600 may be performed by the feature derivation logic 314 shown in FIG. 3, for example. For illustrative purposes, flowchart 600 is described with respect to feature derivation logic 500 shown in FIG. 5. Further structural and operational embodiments will be apparent to persons skilled in the relevant art(s) based on the discussion regarding flowchart 600.

As shown in FIG. 6, the method of flowchart 600 begins at step 602. In step 602, confidences associated with the respective outputs that result from processing of the respective queries by the hosted artificial intelligence system are determined. In an example implementation, the confidence determination logic 540 determines confidences associated with the respective outputs 526 that result from processing of the respective queries by the hosted artificial intelligence system. The confidence determination logic 540 may generate confidence information 546 to indicate the confidences.

At step 604, entropies are determined at respective times that correspond to the respective outputs. Each entropy is based on the confidence associated with the respective output and the confidence of each output that precedes the respective output. In an example implementation, the entropy determination logic 542 determines the entropies at respective times that correspond to the respective outputs 526. For instance, at each time, the entropy determination logic 542 may analyze a distribution of the confidences associated with the respective output and each output that precedes the respective output, as indicated by the confidence information 546, to determine the entropy for that time.

At step 606, a determination is made that a trend of the entropies decreases with reference to time. In an example implementation, the entropy determination logic 542 determines that the trend of the entropies decreases with reference to time. For instance, the entropy determination logic 542 may analyze the entropy for each time, which is determined at step 604, to determine that the trend of the entropies decreases. The entropy determination logic 542 may generate the entropy information 548 to indicate that the trend of the entropies decreases with reference to time.

At step 608, a first feature is derived based at least in part on the trend of the entropies decreasing with reference to time. In an example implementation, the feature logic 544 derives the feature 550 based at least in part on the trend of the entropies decreasing with reference to time. For instance, the feature logic 544 may derive the feature 550 based on receipt of the entropy information (e.g., based on the entropy information 548 indicating that the trend of the entropies decreases with reference to time).

In accordance with the fourth inversion embodiment, the trend of the entropies decreasing with reference to time weighs in favor of increasing the classification score. For instance, the trend of the entropies decreasing with reference to time may indicate an attempt to isolate a potential training point of the hosted artificial intelligence system.

Figure 7:
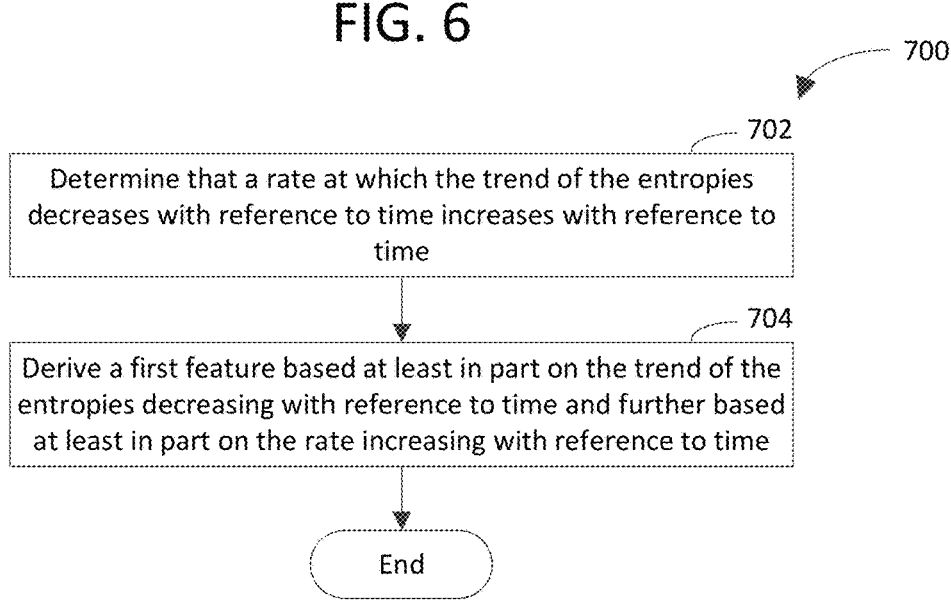

In a fifth inversion embodiment, step 608 of flowchart 600 may be replaced with one or more of the steps shown in flowchart 700 of FIG. 7. For example, a feature derived using the steps shown in flowchart 700 may be referred to as an "output information gain." In accordance with this example, the output information gain is based on a rate at which the decrease in the trend of the entropies described above with reference to the fourth inversion embodiment increases. As shown in FIG. 7, the method of flowchart 700 begins at step 702. In step 702, a determination is made that a rate at which the trend of the entropies decreases with reference to time increases with reference to time. In an example implementation, the entropy determination logic 542 determines that the rate at which the trend of the entropies decreases with reference to time increase with reference to time. For instance, the entropy determination logic 542 may analyze the trend to identify a slope of the trend at each time instance. For instance, the entropy determination logic 542 may determine that the slope of the trend decreases to a greater extent with each successive time instance or that the slope of the trend generally decreases to a greater extent over time. The entropy determination logic 542 may generate the entropy information 548 to indicate that the rate at which the trend of the entropies decreases with reference to time increases with reference to time.

At step 704, a first feature is derived based at least in part on the trend of the entropies decreasing with reference to time and further based at least in part on the rate increasing with reference to time. In an example implementation, the feature logic 544 derives the feature 550 based at least in part on the trend of the entropies decreasing with reference to time and further based at least in part on the rate increasing with reference to time. For instance, the feature logic 544 may derive the feature 550 based on receipt of the entropy information (e.g., based on the entropy information 548 indicating that the trend decreases with reference to time and that the rate increases with reference to time).

In accordance with the fifth inversion embodiment, a combination of the trend of the entropies decreasing with reference to time and the rate increasing with reference to time weighs in favor of increasing the classification score.

Although the inversion embodiments discussed above are described with reference to an inversion attack, the inversion embodiments are not limited to inversion attacks. It will be recognized that the inversion embodiments are applicable to other types of algorithmic attacks in addition to inversion attacks. Accordingly, the known type of algorithmic attack in the inversion embodiments need not necessarily be an inversion attack; the known type of algorithmic attack in the inversion embodiments may be any suitable type of algorithmic attack (e.g., an extraction attack, an evasion attack, or a membership inference attack).

Embodiments in which the known type of algorithmic attack is an extraction attack are referred to herein as "extraction embodiments." In a first extraction embodiment, deriving the features at step 202 includes the steps described above with reference to the second inversion embodiment. However, in accordance with the first extraction embodiment, a relatively high entropy weighs in favor of increasing the classification score, and a relative low entropy weighs against increasing the classification score.

In a second extraction embodiment, deriving the features at step 202 includes one or more of the steps shown in flowchart 400 of FIG. 4, which is described above with reference to the second inversion embodiment. However, in accordance with the second extraction embodiment, a relatively high entropy weighs in favor of increasing the classification score, and a relative low entropy weighs against increasing the classification score.

Figure 8:
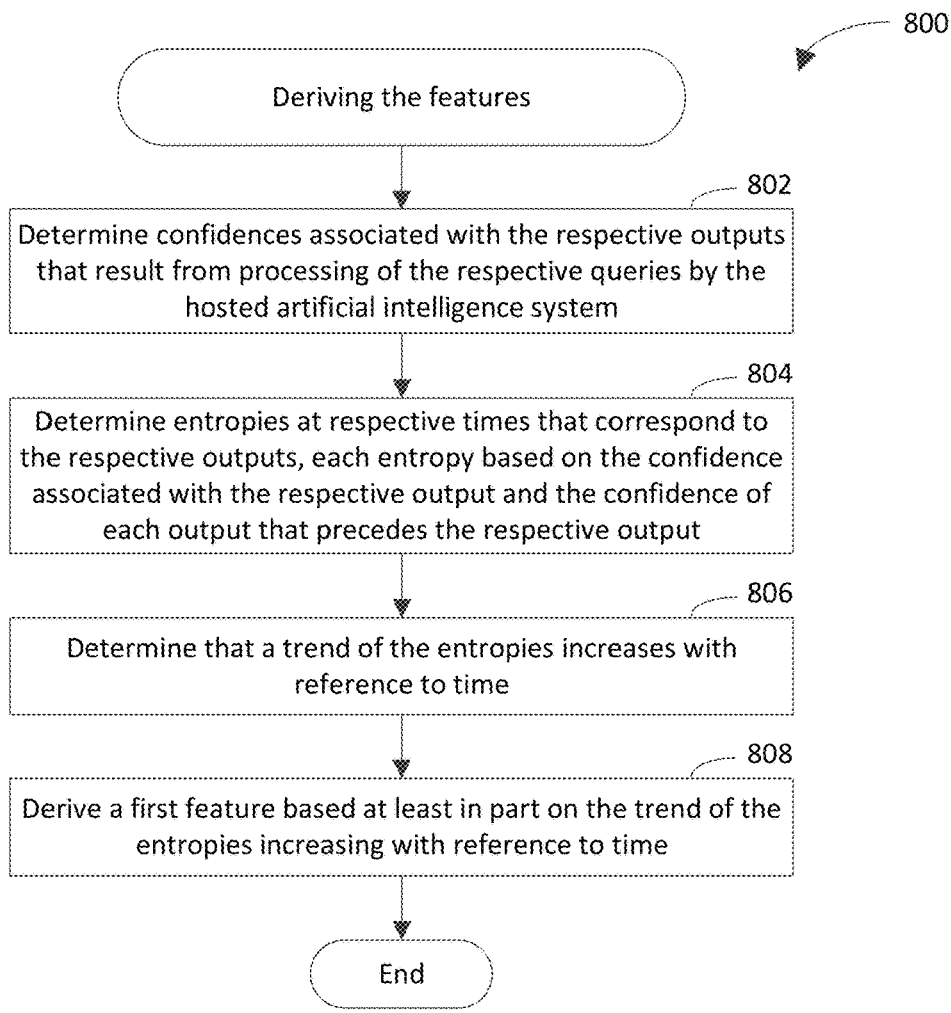

In a third extraction embodiment, deriving the features at step 202 includes one or more of the steps shown in flowchart 800 of FIG. 8. For example, a feature derived using the steps shown in flowchart 800 may be referred to as a "model entropy score." Flowchart 800 may be performed by the feature derivation logic 314 shown in FIG. 3, for example. For illustrative purposes, flowchart 800 is described with respect to feature derivation logic 500 shown in FIG. 5. Further structural and operational embodiments will be apparent to persons skilled in the relevant art(s) based on the discussion regarding flowchart 800.

As shown in FIG. 8, the method of flowchart 800 begins at step 802. In step 802, confidences associated with the respective outputs that result from processing of the respective queries by the hosted artificial intelligence system are determined. In an example implementation, the confidence determination logic 540 determines confidences associated with the respective outputs 526 that result from processing of the respective queries by the hosted artificial intelligence system. The confidence determination logic 540 may generate confidence information 546 to indicate the confidences.

At step 804, entropies are determined at respective times that correspond to the respective outputs. Each entropy is based on the confidence associated with the respective output and the confidence of each output that precedes the respective output. In an example implementation, the entropy determination logic 542 determines the entropies at respective times that correspond to the respective outputs 526.

At step 806, a determination is made that a trend of the entropies increases with reference to time. In an example implementation, the entropy determination logic 542 determines that the trend of the entropies increases with reference to time. For instance, the entropy determination logic 542 may analyze the entropy for each time, which is determined at step 604, to determine that the trend of the entropies increases. The entropy determination logic 542 may generate the entropy information 548 to indicate that the trend of the entropies increases with reference to time.

At step 808, a first feature is derived based at least in part on the trend of the entropies increasing with reference to time. In an example implementation, the feature logic 544 derives the feature 550 based at least in part on the trend of the entropies increasing with reference to time. For instance, the feature logic 544 may derive the feature 550 based on receipt of the entropy information (e.g., based on the entropy information 548 indicating that the trend of the entropies increases with reference to time).

In accordance with the third extraction embodiment, the trend of the entropies increasing with reference to time weighs in favor of increasing the classification score.

Figure 9:
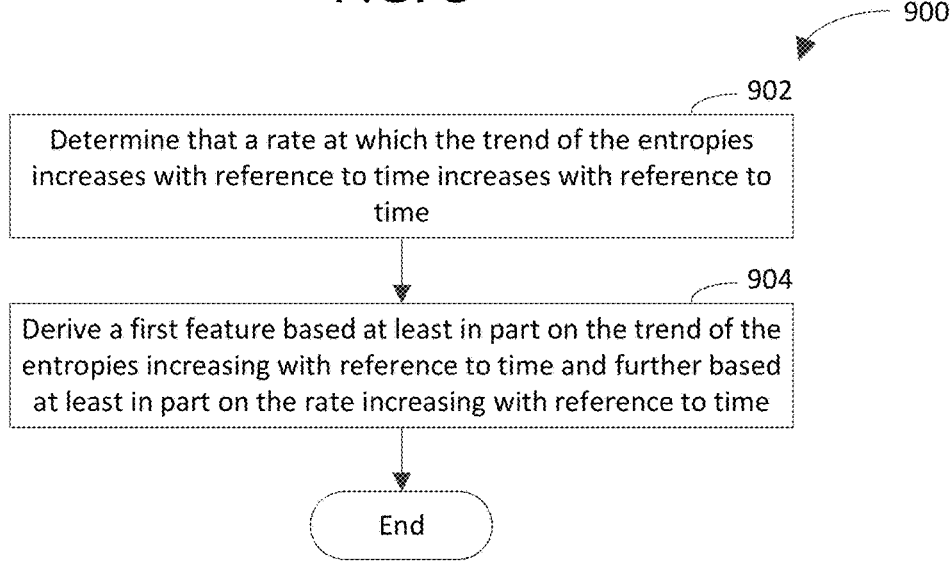

In a fourth extraction embodiment, step 808 of flowchart 800 may be replaced with one or more of the steps shown in flowchart 900 of FIG. 9. For example, a feature derived using the steps shown in flowchart 900 also may be referred to as an "output information gain." In accordance with this example, the output information gain is based on a rate at which the increase in the trend of the entropies described above with reference to the third extraction embodiment increases. As shown in FIG. 9, the method of flowchart 900 begins at step 902. In step 902, a determination is made that a rate at which the trend of the entropies increases with reference to time increases with reference to time. In an example implementation, the entropy determination logic 542 determines that the rate at which the trend of the entropies increases with reference to time increase with reference to time. For instance, the entropy determination logic 542 may analyze the trend to identify a slope of the trend at each time instance. For instance, the entropy determination logic 542 may determine that the slope of the trend increases to a greater extent with each successive time instance or that the slope of the trend generally increases to a greater extent over time. The entropy determination logic 542 may generate the entropy information 548 to indicate that the rate at which the trend of the entropies decreases with reference to time increases with reference to time.

At step 904, a first feature is derived based at least in part on the trend of the entropies increasing with reference to time and further based at least in part on the rate increasing with reference to time. In an example implementation, the feature logic 544 derives the feature 550 based at least in part on the trend of the entropies increasing with reference to time and further based at least in part on the rate increasing with reference to time. For instance, the feature logic 544 may derive the feature 550 based on receipt of the entropy information (e.g., based on the entropy information 548 indicating that the trend increases with reference to time and that the rate increases with reference to time).

In accordance with the fourth extraction embodiment, a combination of the trend of the entropies increasing with reference to time and the rate increasing with reference to time weighs in favor of increasing the classification score.

Although the extraction embodiments discussed above are described with reference to an extraction attack, the extraction embodiments are not limited to extraction attacks. It will be recognized that the extraction embodiments are applicable to other types of algorithmic attacks in addition to extraction attacks. Accordingly, the known type of algorithmic attack in the extraction embodiments need not necessarily be an extraction attack; the known type of algorithmic attack in the extraction embodiments may be any suitable type of algorithmic attack.

Figure 10:
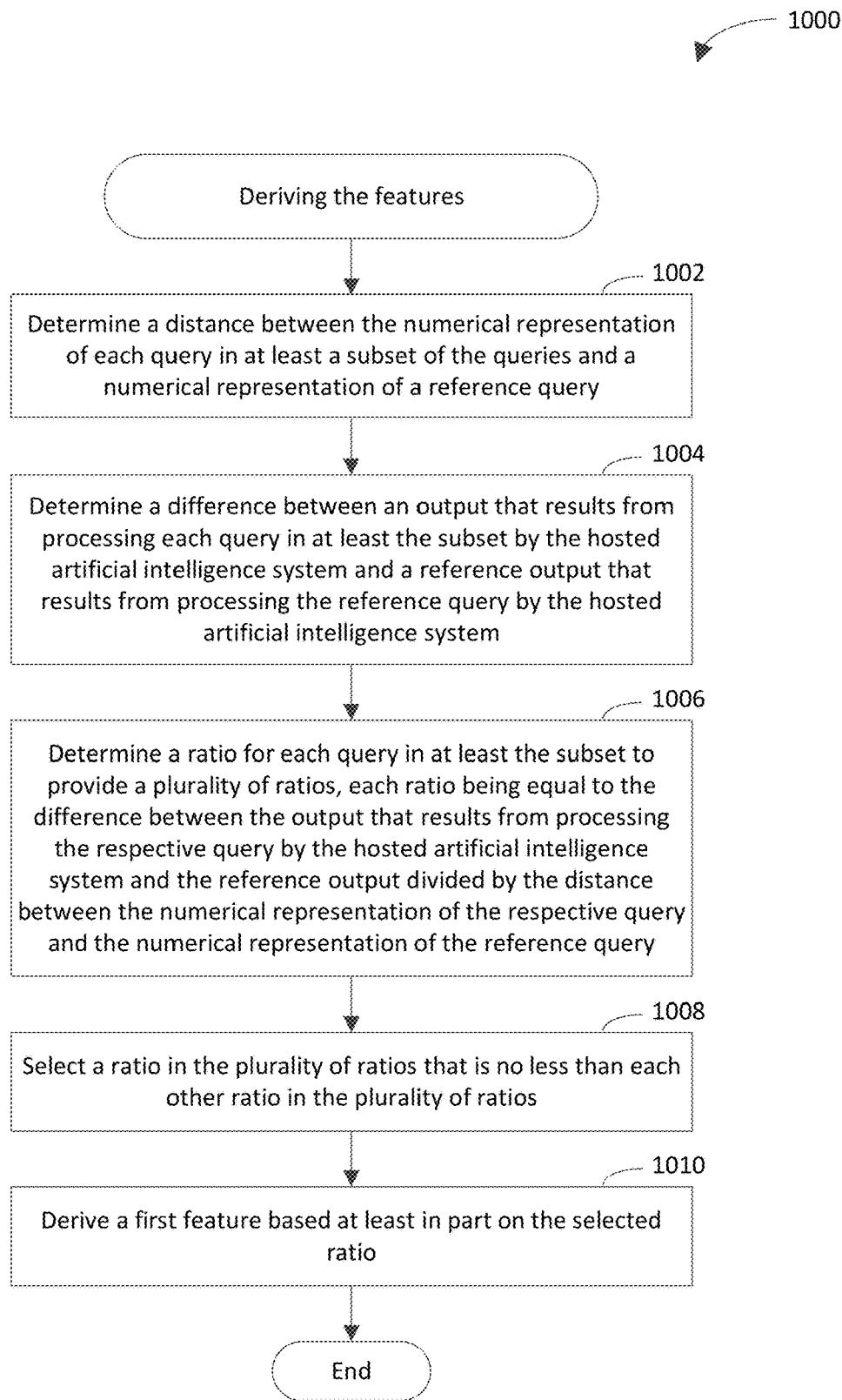

Embodiments in which the known type of algorithmic attack is an evasion attack (e.g., a HopSkipJump attack or a boundary attack) are referred to herein as "evasion embodiments." In a first evasion embodiment, deriving the features at step 202 includes one or more of the steps shown in flowchart 1000 of FIG. 10. For instance, a feature derived using the steps shown in flowchart 1000 may be referred to as an "adversarial example score." Flowchart 1000 may be performed by the feature derivation logic 314 shown in FIG. 3, for example. For illustrative purposes, flowchart 1000 is described with respect to feature derivation logic 1100 shown in FIG. 11, which is an example implementation of the feature derivation logic 314. As shown in FIG. 11, the feature derivation logic 1100 includes input difference logic 1152, output difference logic 1154, ratio determination logic 1156, selection logic 1158, and feature logic 1144. Further structural and operational embodiments will be apparent to persons skilled in the relevant art(s) based on the discussion regarding flowchart 1000.

As shown in FIG. 10, the method of flowchart 1000 begins at step 1002. In step 1002, a distance between the numerical representation of each query in at least a subset of the queries and a numerical representation of a reference query is determined. In an example implementation, the input difference logic 1152 determines a distance between the numerical representation of each query in at least a subset of the queries 1126 and a numerical representation of a reference query 1166. The input difference logic 1152 may generate input distance information 1170 to indicate the distance between the numerical representation of each query in at least a subset of the queries 1126 and the numerical representation of the reference query 1166.

At step 1004, a difference between an output that results from processing each query in at least the subset by the hosted artificial intelligence system and a reference output that results from processing the reference query by the hosted artificial intelligence system is determined. In an example implementation, the output difference logic 1154 determines differences between outputs 1128 that results from processing the respective queries in at least the subset by the hosted artificial intelligence system and a reference output 1168 that results from processing the reference query 1166 by the hosted artificial intelligence system. The output difference logic 1154 may generate output difference information 1172 to indicate the differences between the outputs 1128 and the reference output 1168.

At step 1006, a ratio for each query in at least the subset is determined to provide a plurality of ratios. Each ratio is equal to the difference between the output that results from processing the respective query by the hosted artificial intelligence system and the reference output divided by the distance between the numerical representation of the respective query and the numerical representation of the reference query. In an example implementation, the ratio determination logic 1156 determines the ratio for each query in at least the subset to provide the plurality of ratios. Each ratio is equal to the difference between the output that results from processing the respective query by the hosted artificial intelligence system and the reference output 1168 divided by the distance between the numerical representation of the respective query and the numerical representation of the reference query 1166. The ratio determination logic 1156 may generate ratio information 1160 to indicate the plurality of ratios.

At step 1008, a ratio in the plurality of ratios that is no less than each other ratio in the plurality of ratios is selected. In an example implementation, the selection logic 1158 selects the ratio from the plurality of ratios based on the selected ratio being no less than each other ratio in the plurality of ratios. For instance, the selection logic 1158 may analyze the plurality of ratios, as indicated by the ratio information 1160, to determine that the selected ratio is no less than each other ratio in the plurality of ratios. The selection logic 1158 may generate selection information 1162 to identify the selected ratio.

At step 1010, a first feature is derived based at least in part on the selected ratio. In an example implementation, the feature logic 1144 derives the feature 1150 based at least in part on the selected ratio. For instance, the feature logic 1144 may derive the feature 1150 based on receipt of the selection information 1162 (e.g., based on the selection information 1162 identifying the selected ratio).

In accordance with the first evasion embodiment, the selected ratio being relatively high weighs in favor of increasing the classification score, and the selected ratio being relatively low weighs against increasing the classification score.

Figure 12:
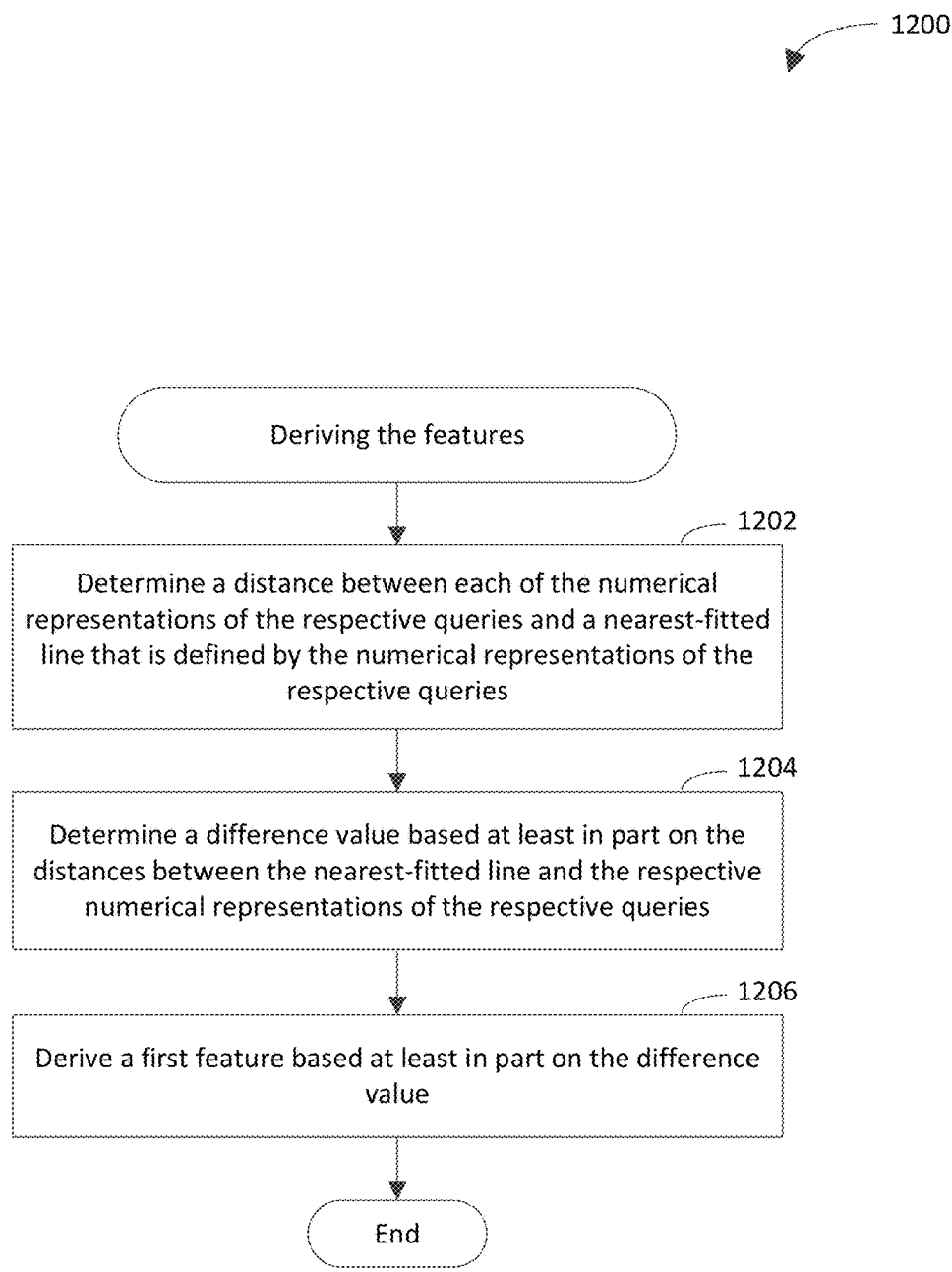

In a second evasion embodiment, deriving the features at step 202 includes one or more of the steps shown in flowchart 1200 of FIG. 12. For example, a feature derived using the steps shown in flowchart 1200 may be referred to as an "intrinsic dimensionality score." In accordance with this example, the intrinsic dimensionality score may indicate that a sequence of the numerical representations of the queries lies along a line (e.g., due to the algorithmic attack leveraging a bisection method). Flowchart 1200 may be performed by the feature derivation logic 314 shown in FIG. 3, for example. For illustrative purposes, flowchart 1200 is described with respect to feature derivation logic 1300 shown in FIG. 13, which is an example implementation of the feature derivation logic 314. As shown in FIG. 13, the feature derivation logic 1300 includes distance determination logic 1374, value determination logic 1376, and feature logic 1344. Further structural and operational embodiments will be apparent to persons skilled in the relevant art(s) based on the discussion regarding flowchart 1200.

As shown in FIG. 12, the method of flowchart 1200 begins at step 1202. In step 1202, a distance (e.g., a shortest distance) between each of the numerical representations of the respective queries and a nearest-fitted line that is defined by the numerical representations of the respective queries is determined. In an example implementation, the distance determination logic 1374 determines a distance between each of the numerical representations of the respective queries 1326 and a nearest-fitted line that is defined by the numerical representations of the respective queries 1326. For instance, the distance determination logic 1374 may calculate the nearest-fitted line using any of a variety of techniques (e.g., a least squares fitting technique) based on the numerical representations of the queries 1326. The distance determination logic 1374 may compare each of the numerical representations of the respective queries 1326 to the nearest-fitted line to determine a shortest distance from the respective numerical representation to the nearest-fitted line. The distance determination logic 1374 may generate distance information 1378 to indicate the distance between each of the numerical representations of the respective queries 1326 and the nearest-fitted line.

At step 1204, a difference value is determined based at least in part on the distances between the nearest-fitted line and the respective numerical representations of the respective queries. In an example implementation, the value determination logic 1376 determines a difference value 1380 based at least in part on the distances between the nearest-fitted line and the respective numerical representations of the respective queries 1326. For instance, the value determination logic 1376 may analyze the distance information to determine the distance between each of the numerical representations of the respective queries 1326 and the nearest-fitted line. The value determination logic 1376 may combine the distances between the numerical representations of the respective queries 1326 and the nearest-fitted line to generate the difference value 1380. For example, the difference value 1380 may be an average or a root-mean-square of the distances.

At step 1206, a first feature is derived based at least in part on the difference value. In an example implementation, the feature logic 1344 derives the feature 1350 based at least in part on the difference value 1380.

In accordance with the second evasion embodiment, the difference value being relatively low weighs in favor of increasing the classification score, and the difference value being relatively high weighs against increasing the classification score.

In a third evasion embodiment, deriving the features at step 202 includes determining that the numerical representations of the respective queries define a Gaussian distribution. For instance, the Gaussian distribution may be a result of a Gaussian random number generator being used to generate the numerical representations of the respective queries. In accordance with the third evasion embodiment, deriving the features at step 202 further includes deriving a first feature based at least in part on the Gaussian distribution. The first feature derived in accordance with the third evasion embodiment may be referred to as a "normality test." The normality test indicates a p-value for a hypothesis test that samples in a sequence belonging to a Gaussian distribution. For instance, the algorithmic attack may use finite difference via Gaussian-drawn samples to estimate gradients. In further accordance with the third evasion embodiment, the numerical representations of the respective queries defining the Gaussian distribution weighs in favor of increasing the classification score.

In a fourth evasion embodiment, deriving the features at step 202 includes one or more of the steps shown in flowchart 800 of FIG. 8, which is described above with reference to the third extraction embodiment. In accordance with the fourth evasion embodiment, the trend of the entropies increasing with reference to time weighs in favor of increasing the classification score.

In a fifth evasion embodiment, step 808 of flowchart 800 may be replaced with one or more of the steps shown in flowchart 900 of FIG. 9, which is described above with reference to the fourth extraction embodiment. In accordance with the fifth evasion embodiment, a combination of the trend of the entropies increasing with reference to time and the rate increasing with reference to time weighs in favor of increasing the classification score.

Although the evasion embodiments discussed above are described with reference to an evasion attack, the evasion embodiments are not limited to evasion attacks. It will be recognized that the evasion embodiments are applicable to other types of algorithmic attacks in addition to evasion attacks. Accordingly, the known type of algorithmic attack in the evasion embodiments need not necessarily be an evasion attack; the known type of algorithmic attack in the evasion embodiments may be any suitable type of algorithmic attack.

Referring back to FIG. 2, at step 204, a feature-based classifier model is used to generate a classification score by providing the derived features as inputs to the feature-based classifier model. Accordingly, the classification score is based at least in part on the derived features. The classification score indicates a likelihood that at least a portion of the queries corresponds to the known type of algorithmic attack. In an example, the classification score may be a multi-class output score, which includes multiple sub-scores corresponding to respective types of attack. In accordance with this example, each sub-score indicates a likelihood that at least a portion of the queries corresponds to the respective type of attack. The classification score may be a logit, though the example embodiments are not limited in this respect. A logit function includes multiple logits that represent respective likelihoods of possible outcomes, and the largest logit is the predicted outcome. It will be recognized that the logits need not necessarily sum to one. The logits may be converted to probabilities that sum to one by normalizing the logits (e.g., by applying a sigmoid function to the logits). Examples of a feature-based classifier model include but are not limited to a gradient-boosting model, a random forest model, a support vector machine, and a multi-layer perceptron (i.e., a deep neural network).

In an example implementation, the model usage logic 316 uses a feature-based classifier model 318 to generate a classification score 332, which indicates a likelihood that at least a portion of the queries 326 corresponds to the known type of algorithmic attack, by providing the derived features 330 as inputs to the feature-based classifier model 318. For instance, the model usage logic 316 may provide the features 330 to the feature-based classifier model 318, which may trigger the feature-based classifier model 318 to analyze the features 330. The feature-based classifier model 318 may analyze the features 330 by comparing the features 330 (e.g., attributes of the features 330) to criteria associated with the algorithmic attack to determine an extent to which the features 330 satisfy the criteria. The feature-based classifier model 318 may generate the classification score 332 to represent the extent to which the features 330 satisfy the criteria. Examples of an attribute of a feature include but are not limited to a numerical value of the feature and a confidence in the numerical value of the feature. Examples of a criterion include but are not limited to a threshold value, a designated range of values, and an association with one or more other features.

Using the feature-based classifier model to generate the classification score at step 204 may reduce an amount of time and/or resources that is consumed to determine whether the algorithmic attack has occurred. Using the feature-based classifier model to generate the classification score at step 204 may increase efficiency of a computing system that is used to detect the algorithmic attack.

At step 206, a determination is made whether the classification score is greater than or equal to a score threshold that is associated with the known type of algorithmic attack. If the classification score is greater than or equal to the score threshold, flow continues to step 208. Otherwise, flow continues to step 210. In an example implementation, the comparison logic 320 determines whether the classification score 332 is greater than or equal to a score threshold 336 that is associated with the known type of algorithmic attack. For instance, the comparison logic 320 may retrieve the score threshold 336 from the store 312. The comparison logic 320 compare the classification score 332 to the score threshold 336 to determine whether the classification score 332 is greater than or equal to the score threshold 336. The comparison logic 320 may generate a comparison result 334, which indicates whether the classification score 332 is greater than or equal to the score threshold 336. For instance, the comparison result 334 may have a first value (e.g., "1") if the classification score 332 is greater than or equal to the score threshold 336. The comparison result 334 may have a second value (e.g., "0"), which is different from the first value, if the classification score 332 is less than the score threshold 336.

At step 208, the algorithmic attack is detected. In an example implementation, the detection logic 322 detects the algorithmic attack. For example, the detection logic 322 may detect the algorithmic attack based on (e.g., as a result of) the comparison result 334 indicating that the classification score 332 is greater than or equal to the score threshold 336 (e.g., based on the comparison result 334 having the first value). In an aspect, the detection logic 322 may detect that the algorithmic attack is of the known type based at least in part on the classification score 332 being greater than or equal to the score threshold 336. Upon completion of step 208, flowchart 200 ends.

At step 210, the algorithmic attack is not detected. In an example implementation, the detection logic 322 does not detect the algorithmic attack. For instance, the detection logic 322 may determine that the algorithmic attack is not occurring or has not occurred. For example, the detection logic 322 may not detect the algorithmic attack based on the comparison result 334 indicating that the classification score 332 is less than the score threshold 336 (e.g., based on the comparison result 334 having the second value). Upon completion of step 210, flowchart 200 ends.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the numerical representations of the respective queries are locality-sensitive hashes of the respective queries. A locality-sensitive hash is a result of applying a locality-sensitive hashing operation (e.g., function) to an input (e.g., a query). A locality-sensitive hashing operation is an operation that hashes similar inputs into the same groups (a.k.a. buckets) with high probability. For instance, the locality-sensitive hashing operation may accept any suitable type of input (e.g., a numeric vector, a string, a text file, or an image) and return a single integer (i.e., group) value in such a way that similar input items return the same group value. It will be recognized that locality-sensitive hashing may enable high-dimensional inputs to be reduced to low-dimensional versions while preserving distances between the inputs. In an example, a locality-sensitive hash may be represented as a series of numbers (e.g., 128 numbers). In another example, the locality-sensitive hashes may be Gaussian sketches. In accordance with this embodiment, the method of flowchart 200 further includes generating the locality-sensitive hashes based on the respective queries. It may be said that the queries are encoded to provide the respective locality-sensitive hashes. It may be further said that the queries are converted into the locality-sensitive hashes using hash operations. In an example implementation, the encoding logic 324 may generate the locality-sensitive hashes of the respective queries 326. Each of the locality-sensitive hashes may be generated in any of a variety of ways depending on a type of the query that is represented by the respective locality-sensitive hash. For instance, a procedure for generating a locality-sensitive hash of an image may be relatively straight-forward, whereas a procedure for generating a locality-sensitive hash of text may be more complex. For example, if a query includes an image, the encoding logic 324 may generate the locality-sensitive hash of the image by performing a hash operation on the raw image. In another example, if a query includes text, the encoding logic 324 may generate the locality-sensitive hash of the text by first converting the text into a numerical representation of the text (e.g., by using a Burton coder) and then performing a hash operation on the numerical representation of the text.

An example implementation that utilizes locality-sensitive hashes will now be described. Suppose that the inputs are numeric two-dimensional (2D) vectors, where each element of the vectors is between 0.0 and 10.0, for example [2.0, 3.0] or [6.5, 0.4]. The maximum distance for any input vector to the origin at [0, 0] is sqrt (10^2+10^2)=sqrt (200)=14.1421. Suppose that three groups are specified: 0, 1, and 2. A locality-sensitive hash function may be defined as follows: If the computed distance is between [0.0, 5.0], return group 0; if between [5.0, 10.0], return group 1; if between [10.0, 15.0], return group 2. With this definition, inputs of [0.0, 1.0] and [1.5, 1.5] both return group 0. In an example, the locality-sensitive hash function can be described as a clustering algorithm, where the group number is synonymous with cluster ID.

It will be recognized that the computing system 300 may not include one or more of the I/O-based attack detection logic 310, the store 312, the feature derivation logic 314, the model usage logic 316, the feature-based classifier model 318, the comparison logic 320, and/or the detection logic 322. Furthermore, the computing system 300 may include components in addition to or in lieu of the I/O-based attack detection logic 310, the store 312, the feature derivation logic 314, the model usage logic 316, the feature-based classifier model 318, the comparison logic 320, and/or the detection logic 322.

FIG. 14 depicts a flowchart 1400 of another example method for detecting an algorithmic attack against a hosted artificial intelligence system based on inputs and outputs of the hosted artificial intelligence system in accordance with an embodiment. Flowchart 1400 may be performed by the first server(s) 106A shown in FIG. 1, for example. For illustrative purposes, flowchart 1400 is described with respect to computing system 1500 shown in FIG. 15, which is an example implementation of the first server(s) 106A. As shown in FIG. 15, the computing system 1500 includes I/O-based attack detection logic 1510 and a store 1512. The I/O-based attack detection logic 1510 includes model usage logic 1516, comparison logic 1520, detection logic 1522, and a transformer-based model 1576. The store 1512 may be any suitable type of store. One type of store is a database. For instance, the store 1512 may be a relational database, an entity-relationship database, an object database, an object relational database, an extensible markup language (XML) database, etc. The store 1512 is shown to store reference vector information 1582 and a distance threshold 1584 for non-limiting, illustrative purposes. Further structural and operational embodiments will be apparent to persons skilled in the relevant art(s) based on the discussion regarding flowchart 1400.

As shown in FIG. 14, the method of flowchart 1400 begins at step 1402. In step 1402, a transformer-based model is used to generate a vector (e.g., a single vector), which summarizes queries that are received by the hosted artificial intelligence system and outputs that result from processing of the respective queries by the hosted artificial intelligence system, by providing a multivariate time series as an input to the transformer-based model. The queries may be associated with a common (e.g., same) user session. For instance, the queries may define the user session. The user session may begin at a first time instance at which a temporally first query of the queries is initiated by the user device and end at a second time instance at which a temporally last output of the outputs is received at the user device. The multivariate time series includes multiple elements. Each element is based at least in part on a pairwise distance between a numerical representation of a respective query and a numerical representation of a previous query that temporally precedes the respective query and is further based at least in part on attribute(s) of the output that results from processing the respective query.

In an example implementation, the model usage logic 1516 uses a transformer-based model 1576 to generate a vector 1580 by providing a multivariate time series 1578 as an input to the transformer-based model 1576. The vector 1580 summarizes queries 1526 that are received by the hosted artificial intelligence system and outputs 1528 that result from processing of the respective queries 1526 by the hosted artificial intelligence system. The multivariate time series 1578 includes multiple elements. Each element is based at least in part on a pairwise distance between a numerical representation of a respective query and a numerical representation of a previous query that temporally precedes the respective query and is further based at least in part on attribute(s) of the output that results from processing the respective query.

Using the transformer-based model to generate the vector at step 1402 may increase accuracy and precision of detecting the algorithmic attack by using both inputs (e.g., queries) and outputs of the hosted artificial intelligence system. By using a summary of the queries and outputs, step 1402 may increase security of the hosted artificial intelligence system and/or increase privacy of a user who initiates the queries. Using the transformer-based model to generate the vector at step 1402 may reduce the size of logs if such logs are used to store information about the queries (e.g., by storing a few numbers for each query, rather than multiple megabytes of data), which may reduce the amount of storage that is consumed for the logs and may reduce the number of computations that are performed on the logs. Accordingly, using the transformer-based model to generate the vector at step 1402 may reduce an amount of time and/or resources that is consumed by a computing system to generate and/or process the logs. Using the transformer-based model to generate the vector at step 1402 may increase efficiency of a computing system that is used to detect the algorithmic attack.

In an example embodiment, the vector includes multiple classifications among which the outputs are classified and multiple confidence values associated with the respective classifications. For instance, each confidence value may be represented using a respective floating point number. In accordance with this embodiment, each confidence value is based on a confidence of a classification of each output in the respective classification. In further accordance with this embodiment, the attribute(s) of each output include a confidence in the respective output (e.g., a confidence that the respective output corresponds to the respective query).

In another example embodiment, the vector includes multiple classifications among which the outputs are classified and multiple confidences associated with the respective classifications. In accordance with this embodiment, the attribute(s) of each output include an entropy associated with a respective plurality of potential outputs, which are associated with the respective query, from which the respective output is selected.

In yet another example embodiment, the attribute(s) of each output include a standard deviation associated with a distribution of a respective plurality of potential outputs, which are associated with the respective query, from which the respective output is selected.

In still another example embodiment, the numerical representation of each query includes a locality-sensitive hash of the respective query. For instance, each locality-sensitive hash may include a Gaussian sketch of the respective query.

In another example embodiment, each element of the multivariate time series is based at least in part on a first pairwise distance between the numerical representation of the respective query and a numerical representation of a previous query that most recently temporally precedes the respective query and is further based at least in part on a second pairwise distance between the numerical representation of the respective query and a numerical representation of a previous query that is a temporally first query among the queries in a user session that is defined by the queries.

At step 1404, a determination is made whether a distance (e.g., a shortest distance) between the vector and a point corresponding to a reference vector that is associated with a known type of algorithmic attack is less than or equal to a distance threshold. For instance, the distance may be measured using cosign similarities. If the distance is less than or equal to the distance threshold, flow continues to step 1406. Otherwise, flow continues to step 1408. In an example implementation, the comparison logic 1520 determines whether a distance between the vector 1580 and a point corresponding to a reference vector that is associated with a known type of algorithmic attack is less than or equal to a distance threshold 1584. For instance, the comparison logic 1520 may retrieve reference vector information 1582 and the distance threshold 1584 from the store 1512. The comparison logic 1520 may determine the reference vector based on the reference vector information 1582 indicating the reference vector. The comparison logic 1520 may generate a comparison result 1534 to indicate whether the distance between the vector 1580 and the point is less than or equal to the distance threshold 1584. For instance, the comparison result 1534 may have a first value (e.g., "1") if the distance between the vector 1580 and the point is less than or equal to the distance threshold 1584. The comparison result 1534 may have a second value (e.g., "0") if the distance between the vector 1580 and the point is greater than the distance threshold 1584.

In an example embodiment, the point corresponds to a centroid of multiple reference vectors that are associated with the known type of algorithmic attack. For example, the point may represent the centroid. In another example, the point may be the centroid. In an aspect of this embodiment, the distance threshold is defined by a radius that extends from the centroid to define a circle that includes the reference vectors and that includes no other vectors generated by the transformer-based model. At step 1406, the algorithmic attack is detected. In an example implementation, the detection logic 1522 detects the algorithmic attack. For example, the detection logic 1522 may detect the algorithmic attack based on (e.g., as a result of) the comparison result 1534 indicating that the distance between the vector 1580 and the point is less than or equal to the distance threshold 1584 (e.g., based on the comparison result 1534 having the first value). In an aspect, the detection logic 1522 may detect that the algorithmic attack is of the known type based at least in part on the distance between the vector 1580 and the point being less than or equal to the distance threshold 1584. Upon completion of step 1406, flowchart 1400 ends.

At step 1408, the algorithmic attack is not detected. In an example implementation, the detection logic 1522 does not detect the algorithmic attack. For instance, the detection logic 1522 may determine that the algorithmic attack is not occurring or has not occurred. For example, the detection logic 1522 may not detect the algorithmic attack based on the comparison result 1534 indicating that the distance between the vector 1580 and the point is greater than the distance threshold 1584 (e.g., based on the comparison result 1534 having the second value). Upon completion of step 1408, flowchart 1400 ends.

In some example embodiments, one or more steps 1402, 1404, 1406, and/or 1408 of flowchart 1400 may not be performed. Moreover, steps in addition to or in lieu of steps 1402, 1404, 1406, and/or 1408 may be performed.

It will be recognized that the computing system 1500 may not include one or more of the I/O-based attack detection logic 1510, the store 1512, the model usage logic 1516, the comparison logic 1520, the detection logic 1522, and/or the transformer-based model 1576. Furthermore, the computing system 1500 may include components in addition to or in lieu of the I/O-based attack detection logic 1510, the store 1512, the model usage logic 1516, the comparison logic 1520, the detection logic 1522, and/or the transformer-based model 1576.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the I/O-based attack detection logic 310, the feature derivation logic 314, the model usage logic 316, the feature-based classifier model 318, the comparison logic 320, the detection logic 322, the confidence determination logic 540, the entropy determination logic 542, the feature logic 544, the input difference logic 1152, the output difference logic 1154, the ratio determination logic 1156, the selection logic 1158, the feature logic 1144, the distance determination logic 1374, the value determination logic 1376, the feature logic 1344, the I/O-based attack detection logic 1510, the model usage logic 1516, the comparison logic 1520, the detection logic 1522, and/or the transformer-based model 1576, flowchart 200, flowchart 400, flowchart 600, flowchart 700, flowchart 800, flowchart 900, flowchart 1000, flowchart 1200, and/or flowchart 1400 may be implemented in hardware, software, firmware, or any combination thereof.

For example, any one or more of the I/O-based attack detection logic 310, the feature derivation logic 314, the model usage logic 316, the feature-based classifier model 318, the comparison logic 320, the detection logic 322, the confidence determination logic 540, the entropy determination logic 542, the feature logic 544, the input difference logic 1152, the output difference logic 1154, the ratio determination logic 1156, the selection logic 1158, the feature logic 1144, the distance determination logic 1374, the value determination logic 1376, the feature logic 1344, the I/O-based attack detection logic 1510, the model usage logic 1516, the comparison logic 1520, the detection logic 1522, and/or the transformer-based model 1576, flowchart 200, flowchart 400, flowchart 600, flowchart 700, flowchart 800, flowchart 900, flowchart 1000, flowchart 1200, and/or flowchart 1400 may be implemented, at least in part, as computer program code configured to be executed in one or more processors.

In another example, any one or more of the I/O-based attack detection logic 310, the feature derivation logic 314, the model usage logic 316, the feature-based classifier model 318, the comparison logic 320, the detection logic 322, the confidence determination logic 540, the entropy determination logic 542, the feature logic 544, the input difference logic 1152, the output difference logic 1154, the ratio determination logic 1156, the selection logic 1158, the feature logic 1144, the distance determination logic 1374, the value determination logic 1376, the feature logic 1344, the I/O-based attack detection logic 1510, the model usage logic 1516, the comparison logic 1520, the detection logic 1522, and/or the transformer-based model 1576, flowchart 200, flowchart 400, flowchart 600, flowchart 700, flowchart 800, flowchart 900, flowchart 1000, flowchart 1200, and/or flowchart 1400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments (A1) A first example system (FIG. 1, 102A-102M, 106A-106N; FIG. 3, 300; FIG. 16, 1600) to detect an algorithmic attack against a hosted artificial intelligence system comprises a memory (FIG. 16, 1604, 1608, 1610) and a processing system (FIG. 16, 1602) coupled to the memory. The processing system is configured to derive (FIG. 2, 202) features (FIG. 3, 330), which are associated with a known type of algorithmic attack, from numerical representations of respective queries (FIG. 3, 326) that are received by the hosted artificial intelligence system and outputs (FIG. 3, 328) that result from processing of the respective queries by the hosted artificial intelligence system. The processing system is further configured to use (FIG. 2, 204) a feature-based classifier model (FIG. 3, 318) to generate a classification score (FIG. 3, 332), which indicates a likelihood that at least a portion of the queries corresponds to the known type of algorithmic attack, by providing the derived features as inputs to the feature-based classifier model. The processing system is further configured to compare (FIG. 2, 206) the classification score to a score threshold (FIG. 3, 336) that is associated with the known type of algorithmic attack. The processing system is further configured to detect (FIG. 2, 208) the algorithmic attack based at least in part on the classification score being greater than or equal to the score threshold that is associated with the known type of algorithmic attack.

(A2) In the example system of A1, wherein the numerical representations of the respective queries are locality-sensitive hashes of the respective queries.

(A3) In the example system of any of A1-A2, wherein the queries that are received by the hosted artificial intelligence system include a first query; wherein the first query includes an image; and wherein the processing system is further configured to: perform a hash operation on the image to generate a first locality-sensitive hash, which is included in the locality-sensitive hashes.

(A4) In the example system of any of A1-A3, wherein the queries that are received by the hosted artificial intelligence system include a first query; wherein the first query includes text; and wherein the processing system is further configured to: convert the text into a numerical representation of the text; and perform a hash operation on the numerical representation of the text to generate a first locality-sensitive hash, which is included in the locality-sensitive hashes.

(A5) In the example system of any of A1-A4, wherein the processing system is configured to: spectrally analyze the outputs that result from processing of the respective queries by the hosted artificial intelligence system to determine that the outputs exhibit periodicity; and derive a first feature based at least in part on the outputs exhibiting periodicity; and wherein the outputs exhibiting periodicity weighs in favor of increasing the classification score.

(A6) In the example system of any of A1-A5, wherein the processing system is configured to: determine a distance between the numerical representation of each query in at least a subset of the queries and a numerical representation of a reference query; determine a difference between an output that results from processing each query in at least the subset by the hosted artificial intelligence system and a reference output that results from processing the reference query by the hosted artificial intelligence system; determine a ratio for each query in at least the subset to provide a plurality of ratios, each ratio being equal to the difference between the output that results from processing the respective query by the hosted artificial intelligence system and the reference output divided by the distance between the numerical representation of the respective query and the numerical representation of the reference query; select a ratio in the plurality of ratios that is no less than each other ratio in the plurality of ratios; and derive a first feature based at least in part on the selected ratio; wherein the selected ratio being relatively high weighs in favor of increasing the classification score; and wherein the selected ratio being relatively low weighs against increasing the classification score.

(A7) In the example system of any of A1-A6, wherein the processing system is configured to: determine a distance between each of the numerical representations of the respective queries and a nearest-fitted line that is defined by the numerical representations of the respective queries; determine a difference value based at least in part on the distances between the nearest-fitted line and the respective numerical representations of the respective queries; and derive a first feature based at least in part on the difference value; wherein the difference value being relatively low weighs in favor of increasing the classification score; and wherein the difference value being relatively high weighs against increasing the classification score.

(A8) In the example system of any of A1-A7, wherein the processing system is configured to: determine that the numerical representations of the respective queries define a Gaussian distribution; and derive a first feature based at least in part on the Gaussian distribution; and wherein the numerical representations of the respective queries defining the Gaussian distribution weighs in favor of increasing the classification score.

(A9) In the example system of any of A1-A8, wherein the processing system is configured to: derive the first feature based at least in part on a standard deviation of the Gaussian distribution; wherein the standard deviation being relatively low weighs in favor of increasing the classification score; and wherein the standard deviation being relatively high weighs against increasing the classification score.

(A10) In the example system of any of A1-A9, wherein the processing system is configured to: determine an entropy associated with the numerical representations of the respective queries; and derive a first feature based at least in part on the entropy; wherein a relatively low entropy weighs in favor of increasing the classification score; and wherein a relative high entropy weighs against increasing the classification score.

(A11) In the example system of any of A1-A10, wherein the processing system is configured to: determine confidences associated with the respective outputs that result from processing of the respective queries by the hosted artificial intelligence system; determine an entropy associated with the confidences; and derive a first feature based at least in part on the entropy; wherein a relatively low entropy weighs in favor of increasing the classification score; and wherein a relative high entropy weighs against increasing the classification score.

(A12) In the example system of any of A1-A11, wherein the processing system is configured to: determine confidences associated with the respective outputs that result from processing of the respective queries by the hosted artificial intelligence system; determine entropies at respective times that correspond to the respective outputs, each entropy based on the confidence associated with the respective output and the confidence of each output that precedes the respective output; determine that a trend of the entropies decreases with reference to time; and derive a first feature based at least in part on the trend of the entropies decreasing with reference to time; and wherein the trend of the entropies decreasing with reference to time weighs in favor of increasing the classification score.

(A13) In the example system of any of A1-A12, wherein the processing system is configured to: determine an entropy associated with the numerical representations of the respective queries; and derive a first feature based at least in part on the entropy; wherein a relatively high entropy weighs in favor of increasing the classification score; and wherein a relative low entropy weighs against increasing the classification score.

(A14) In the example system of any of A1-A13, wherein the processing system is configured to: determine confidences associated with the respective outputs that result from processing of the respective queries by the hosted artificial intelligence system; determine an entropy associated with the confidences; and derive a first feature based at least in part on the entropy; wherein a relatively high entropy weighs in favor of increasing the classification score; and wherein a relative low entropy weighs against increasing the classification score.

(A15) In the example system of any of A1-A14, wherein the processing system is configured to: determine confidences associated with the respective outputs that result from processing of the respective queries by the hosted artificial intelligence system; determine entropies at respective times that correspond to the respective outputs, each entropy based on the confidence associated with the respective output and the confidence of each output that precedes the respective output; determine that a trend of the entropies increases with reference to time; and derive a first feature based at least in part on the trend of the entropies increasing with reference to time; and wherein the trend of the entropies increasing with reference to time weighs in favor of increasing the classification score.

(A16) In the example system of any of A1-A15, wherein the processing system is configured to: determine confidences associated with the respective outputs that result from processing of the respective queries by the hosted artificial intelligence system; determine entropies at respective times that correspond to the respective outputs, each entropy based on the confidence associated with the respective output and the confidence of each output that precedes the respective output; determine that a trend of the entropies increases or decreases with reference to time; determine that a rate at which the trend of the entropies increases or decreases with reference to time increases with reference to time; and derive a first feature based at least in part on the trend of the entropies increasing or decreasing with reference to time and further based at least in part on the rate increasing with reference to time; wherein a combination of the trend of the entropies increasing or decreasing with reference to time and the rate increasing with reference to time weighs in favor of increasing the classification score.

(A17) In the example system of any of A1-A16, wherein the processing system is configured to: detect that the algorithmic attack is of the known type based at least in part on the classification score being greater than or equal to the score threshold that is associated with the known type of algorithmic attack.

(B1) A second example system (FIG. 1, 102A-102M, 106A-106N; FIG. 15, 1500; FIG. 16, 1600) to detect an algorithmic attack against a hosted artificial intelligence system comprises a memory (FIG. 16, 1604, 1608, 1610) and a processing system (FIG. 16, 1602) coupled to the memory. The processing system is configured to use (FIG. 14, 1402) a transformer-based model (FIG. 15, 1576) to generate a vector (FIG. 15, 1580), which summarizes a plurality of queries (FIG. 15, 1526) that are received by the hosted artificial intelligence system and a plurality of outputs (FIG. 15, 1528) that result from processing of the plurality of respective queries by the hosted artificial intelligence system, by providing a multivariate time series (FIG. 15, 1578) as an input to the transformer-based model. The multivariate time series includes a plurality of elements. Each element is based at least in part on a pairwise distance between a numerical representation of a respective query of the plurality of queries and a numerical representation of a previous query that temporally precedes the respective query and further based at least in part on one or more attributes of the output that results from processing the respective query. The processing system is further configured to determine (FIG. 14, 1404) whether a distance between the vector and a point corresponding to a reference vector that is associated with a known type of algorithmic attack is less than or equal to a distance threshold (FIG. 15, 1584). The processing system is further configured to detect (FIG. 14, 1406) the algorithmic attack based at least in part on the distance between the vector and the point being less than or equal to the distance threshold.

(B2) In the example system of B1, wherein the vector includes a plurality of classifications among which the outputs are classified and a plurality of confidence values associated with the plurality of respective classifications, wherein each confidence value is based on a confidence of a classification of each output in the respective classification; and wherein the one or more attributes of each output comprise a confidence in the respective output.

(B3) In the example system of any of B1-B2, wherein the vector includes a plurality of classifications among which the outputs are classified and a plurality of confidences associated with the plurality of respective classifications; and wherein the one or more attributes of each output comprise an entropy associated with a respective plurality of potential outputs, which are associated with the respective query, from which the respective output is selected.

(B4) In the example system of any of B1-B3, wherein the one or more attributes of each output comprise a standard deviation associated with a distribution of a respective plurality of potential outputs, which are associated with the respective query, from which the respective output is selected.

(B5) In the example system of any of B1-B4, wherein the numerical representation of each query of the plurality of queries includes a locality-sensitive hash of the respective query.

(B6) In the example system of any of B1-B5, wherein each element is based at least in part on a first pairwise distance between the numerical representation of the respective query of the plurality of queries and a numerical representation of a previous query that most recently temporally precedes the respective query and is further based at least in part on a second pairwise distance between the numerical representation of the respective query and a numerical representation of a previous query that is a temporally first query in a user session that is defined by the plurality of queries.

(B7) In the example system of any of B1-B6, wherein the processing system is configured to: determine whether the distance between the vector and the point, which corresponds to a centroid of a plurality of reference vectors that are associated with the known type of algorithmic attack, is less than or equal to a distance threshold.

(B8) In the example system of any of B1-B7, wherein the distance threshold is defined by a radius that extends from the centroid to define a circle that includes the plurality of reference vectors and that includes no other vectors generated by the transformer-based model.

(B9) In the example system of any of B1-B8, wherein the processing system is configured to: detect that the algorithmic attack is of the known type based at least in part on the distance between the vector and the point, which corresponds to the reference vector that is associated with the known type of algorithmic attack, being less than or equal to the distance threshold.

(C1) A first example method of detecting an algorithmic attack against a hosted artificial intelligence system. The method is implemented by a computing system (FIG. 1, 102A-102M, 106A-106N; FIG. 3, 300; FIG. 16, 1600). The method comprises deriving (FIG. 2, 202) features (FIG. 3, 330), which are associated with a known type of algorithmic attack, from numerical representations of respective queries (FIG. 3, 326) that are received by the hosted artificial intelligence system and outputs (FIG. 3, 328) that result from processing of the respective queries by the hosted artificial intelligence system. The method further comprises using (FIG. 2, 204) a feature-based classifier model (FIG. 3, 318) to generate a classification score (FIG. 3, 332), which indicates a likelihood that at least a portion of the queries corresponds to the known type of algorithmic attack, by providing the derived features as inputs to the feature-based classifier model. The method further comprises comparing (FIG. 2, 206) the classification score to a score threshold (FIG. 3, 336) that is associated with the known type of algorithmic attack. The method further comprises detecting (FIG. 2, 208) the algorithmic attack based at least in part on the classification score being greater than or equal to the score threshold that is associated with the known type of algorithmic attack.

(C2) In the method of C1, wherein the numerical representations of the respective queries are locality-sensitive hashes of the respective queries.

(C3) In the method of any of C1-C2, wherein the queries that are received by the hosted artificial intelligence system include a first query; wherein the first query includes an image; and wherein the method further comprises: performing a hash operation on the image to generate a first locality-sensitive hash, which is included in the locality-sensitive hashes.

(C4) In the method of any of C1-C3, wherein the queries that are received by the hosted artificial intelligence system include a first query; wherein the first query includes text; and wherein the method further comprises: converting the text into a numerical representation of the text; and performing a hash operation on the numerical representation of the text to generate a first locality-sensitive hash, which is included in the locality-sensitive hashes.

(C5) In the method of any of C1-C4, wherein deriving the features comprises: spectrally analyzing the outputs that result from processing of the respective queries by the hosted artificial intelligence system to determine that the outputs exhibit periodicity; and deriving a first feature based at least in part on the outputs exhibiting periodicity; and wherein the outputs exhibiting periodicity weighs in favor of increasing the classification score.

(C6) In the method of any of C1-C5, wherein deriving the features comprises: determining a distance between the numerical representation of each query in at least a subset of the queries and a numerical representation of a reference query; determining a difference between an output that results from processing each query in at least the subset by the hosted artificial intelligence system and a reference output that results from processing the reference query by the hosted artificial intelligence system; determining a ratio for each query in at least the subset to provide a plurality of ratios, each ratio being equal to the difference between the output that results from processing the respective query by the hosted artificial intelligence system and the reference output divided by the distance between the numerical representation of the respective query and the numerical representation of the reference query; selecting a ratio in the plurality of ratios that is no less than each other ratio in the plurality of ratios; and deriving a first feature based at least in part on the selected ratio; wherein the selected ratio being relatively high weighs in favor of increasing the classification score; and wherein the selected ratio being relatively low weighs against increasing the classification score.

(C7) In the method of any of C1-C6, wherein deriving the features comprises: determining a distance between each of the numerical representations of the respective queries and a nearest-fitted line that is defined by the numerical representations of the respective queries; determining a difference value based at least in part on the distances between the nearest-fitted line and the respective numerical representations of the respective queries; and deriving a first feature based at least in part on the difference value; wherein the difference value being relatively low weighs in favor of increasing the classification score; and wherein the difference value being relatively high weighs against increasing the classification score.

(C8) In the method of any of C1-C7, wherein deriving the features comprises: determining that the numerical representations of the respective queries define a Gaussian distribution; and deriving a first feature based at least in part on the Gaussian distribution; and wherein the numerical representations of the respective queries defining the Gaussian distribution weighs in favor of increasing the classification score.

(C9) In the method of any of C1-C8, wherein deriving the first feature comprises: deriving the first feature based at least in part on a standard deviation of the Gaussian distribution; wherein the standard deviation being relatively low weighs in favor of increasing the classification score; and wherein the standard deviation being relatively high weighs against increasing the classification score.

(C10) In the method of any of C1-C9, wherein deriving the features comprises: determining an entropy associated with the numerical representations of the respective queries; and deriving a first feature based at least in part on the entropy; wherein a relatively low entropy weighs in favor of increasing the classification score; and wherein a relative high entropy weighs against increasing the classification score.

(C11) In the method of any of C1-C10, wherein deriving the features comprises: determining confidences associated with the respective outputs that result from processing of the respective queries by the hosted artificial intelligence system; determining an entropy associated with the confidences; and deriving a first feature based at least in part on the entropy; wherein a relatively low entropy weighs in favor of increasing the classification score; and wherein a relative high entropy weighs against increasing the classification score.

(C12) In the method of any of C1-C11, wherein deriving the features comprises: determining confidences associated with the respective outputs that result from processing of the respective queries by the hosted artificial intelligence system; determining entropies at respective times that correspond to the respective outputs, each entropy based on the confidence associated with the respective output and the confidence of each output that precedes the respective output; determining that a trend of the entropies decreases with reference to time; and deriving a first feature based at least in part on the trend of the entropies decreasing with reference to time; and wherein the trend of the entropies decreasing with reference to time weighs in favor of increasing the classification score.

(C13) In the method of any of C1-C12, wherein deriving the features comprises: determining an entropy associated with the numerical representations of the respective queries; and deriving a first feature based at least in part on the entropy; wherein a relatively high entropy weighs in favor of increasing the classification score; and wherein a relative low entropy weighs against increasing the classification score.

(C14) In the method of any of C1-C13, wherein deriving the features comprises: determining confidences associated with the respective outputs that result from processing of the respective queries by the hosted artificial intelligence system; determining an entropy associated with the confidences; and deriving a first feature based at least in part on the entropy; wherein a relatively high entropy weighs in favor of increasing the classification score; and wherein a relative low entropy weighs against increasing the classification score.

(C15) In the method of any of C1-C14, wherein deriving the features comprises: determining confidences associated with the respective outputs that result from processing of the respective queries by the hosted artificial intelligence system; determining entropies at respective times that correspond to the respective outputs, each entropy based on the confidence associated with the respective output and the confidence of each output that precedes the respective output; determining that a trend of the entropies increases with reference to time; and deriving a first feature based at least in part on the trend of the entropies increasing with reference to time; and wherein the trend of the entropies increasing with reference to time weighs in favor of increasing the classification score.

(C16) In the method of any of C1-C15, wherein deriving the features comprises: determining confidences associated with the respective outputs that result from processing of the respective queries by the hosted artificial intelligence system; determining entropies at respective times that correspond to the respective outputs, each entropy based on the confidence associated with the respective output and the confidence of each output that precedes the respective output; determining that a trend of the entropies increases or decreases with reference to time; determining that a rate at which the trend of the entropies increases or decreases with reference to time increases with reference to time; and deriving a first feature based at least in part on the trend of the entropies increasing or decreasing with reference to time and further based at least in part on the rate increasing with reference to time; and wherein a combination of the trend of the entropies increasing or decreasing with reference to time and the rate increasing with reference to time weighs in favor of increasing the classification score.

(C17) In the method of any of C1-C16, wherein detecting the algorithmic attack comprises: detecting that the algorithmic attack is of the known type based at least in part on the classification score being greater than or equal to the score threshold that is associated with the known type of algorithmic attack.

(D1) A second example method of detecting an algorithmic attack against a hosted artificial intelligence system. The method is implemented by a computing system (FIG. 1, 102A-102M, 106A-106N; FIG. 15, 1500; FIG. 16, 1600). The method comprises using (FIG. 14, 1402) a transformer-based model (FIG. 15, 1576) to generate a vector (FIG. 15, 1580), which summarizes a plurality of queries (FIG. 15, 1526) that are received by the hosted artificial intelligence system and a plurality of outputs (FIG. 15, 1528) that result from processing of the plurality of respective queries by the hosted artificial intelligence system, by providing a multivariate time series (FIG. 15, 1578) as an input to the transformer-based model, the multivariate time series including a plurality of elements, each element based at least in part on a pairwise distance between a numerical representation of a respective query of the plurality of queries and a numerical representation of a previous query that temporally precedes the respective query and further based at least in part on one or more attributes of the output that results from processing the respective query. The method further comprises determining (FIG. 14, 1404) whether a distance between the vector and a point corresponding to a reference vector that is associated with a known type of algorithmic attack is less than or equal to a distance threshold (FIG. 15, 1584). The method further comprises detecting (FIG. 14, 1406) the algorithmic attack based at least in part on the distance between the vector and the point being less than or equal to the distance threshold.

(D2) In the method of D1, wherein the vector includes a plurality of classifications among which the outputs are classified and a plurality of confidence values associated with the plurality of respective classifications, wherein each confidence value is based on a confidence of a classification of each output in the respective classification; and wherein the one or more attributes of each output comprise a confidence in the respective output.

(D3) In the method of any of D1-D2, wherein the vector includes a plurality of classifications among which the outputs are classified and a plurality of confidences associated with the plurality of respective classifications; and wherein the one or more attributes of each output comprise an entropy associated with a respective plurality of potential outputs, which are associated with the respective query, from which the respective output is selected.

(D4) In the method of any of D1-D3, wherein the one or more attributes of each output comprise a standard deviation associated with a distribution of a respective plurality of potential outputs, which are associated with the respective query, from which the respective output is selected.

(D5) In the method of any of D1-D4, wherein the numerical representation of each query of the plurality of queries includes a locality-sensitive hash of the respective query.

(D6) In the method of any of D1-D5, wherein each element is based at least in part on a first pairwise distance between the numerical representation of the respective query of the plurality of queries and a numerical representation of a previous query that most recently temporally precedes the respective query and is further based at least in part on a second pairwise distance between the numerical representation of the respective query and a numerical representation of a previous query that is a temporally first query in a user session that is defined by the plurality of queries.

(D7) In the method of any of DI-D6, wherein determining whether the distance between the vector and the point is less than or equal to the distance threshold comprises: determining whether the distance between the vector and the point, which corresponds to a centroid of a plurality of reference vectors that are associated with the known type of algorithmic attack, is less than or equal to a distance threshold.

(D8) In the method of any of D1-D7, wherein the distance threshold is defined by a radius that extends from the centroid to define a circle that includes the plurality of reference vectors and that includes no other vectors generated by the transformer-based model.

(D9) In the method of any of D1-D8, wherein detecting the algorithmic attack comprises: detecting that the algorithmic attack is of the known type based at least in part on the distance between the vector and the point, which corresponds to the reference vector that is associated with the known type of algorithmic attack, being less than or equal to the distance threshold.

(E1) A first example computer program product (FIG. 16, 1618, 1622) comprising a computer-readable storage medium having instructions recorded thereon for enabling a processor-based system (FIG. 1, 102A-102M, 106A-106N; FIG. 3, 300; FIG. 16, 1600) to detect an algorithmic attack against a hosted artificial intelligence system by performing operations. The operations comprise deriving (FIG. 2, 202) features (FIG. 3, 330), which are associated with a known type of algorithmic attack, from numerical representations of respective queries (FIG. 3, 326) that are received by the hosted artificial intelligence system and outputs (FIG. 3, 328) that result from processing of the respective queries by the hosted artificial intelligence system. The operations further comprise using (FIG. 2, 204) a feature-based classifier model (FIG. 3, 318) to generate a classification score (FIG. 3, 332), which indicates a likelihood that at least a portion of the queries corresponds to the known type of algorithmic attack, by providing the derived features as inputs to the feature-based classifier model. The operations further comprise comparing (FIG. 2, 206) the classification score to a score threshold (FIG. 3, 336) that is associated with the known type of algorithmic attack. The operations further comprise detecting (FIG. 2, 208) the algorithmic attack based at least in part on the classification score being greater than or equal to the score threshold that is associated with the known type of algorithmic attack.

(F1) A second example computer program product (FIG. 16, 1618, 1622) comprising a computer-readable storage medium having instructions recorded thereon for enabling a processor-based system (FIG. 1, 102A-102M, 106A-106N; FIG. 15, 1500; FIG. 16, 1600) to detect an algorithmic attack against a hosted artificial intelligence system by performing operations. The operations comprise using (FIG. 14, 1402) a transformer-based model (FIG. 15, 1576) to generate a vector (FIG. 15, 1580), which summarizes a plurality of queries (FIG. 15, 1526) that are received by the hosted artificial intelligence system and a plurality of outputs (FIG. 15, 1528) that result from processing of the plurality of respective queries by the hosted artificial intelligence system, by providing a multivariate time series (FIG. 15, 1578) as an input to the transformer-based model. The multivariate time series includes a plurality of elements. Each element is based at least in part on a pairwise distance between a numerical representation of a respective query of the plurality of queries and a numerical representation of a previous query that temporally precedes the respective query and further based at least in part on one or more attributes of the output that results from processing the respective query. The operations further comprise determining (FIG. 14, 1404) whether a distance between the vector and a point corresponding to a reference vector that is associated with a known type of algorithmic attack is less than or equal to a distance threshold (FIG. 15, 1584). The operations further comprise detecting (FIG. 14, 1406) the algorithmic attack based at least in part on the distance between the vector and the point being less than or equal to the distance threshold.

IV. Example Computer System

FIG. 16 depicts an example computer 1600 in which embodiments may be implemented. Any one or more of the user devices 102A-102M and/or any one or more of the servers 106A-106N shown in FIG. 1, the computing system 300 shown in FIG. 3, and/or the computing system 1500 shown in FIG. 15 may be implemented using computer 1600, including one or more features of computer 1600 and/or alternative features. Computer 1600 may be a general-purpose computing device in the form of a conventional personal computer, a mobile computer, or a workstation, for example, or computer 1600 may be a special purpose computing device. The description of computer 1600 provided herein is provided for purposes of illustration, and is not intended to be limiting. Embodiments may be implemented in further types of computer systems, as would be known to persons skilled in the relevant art(s).

As shown in FIG. 16, computer 1600 includes a processing unit 1602, a system memory 1604, and a bus 1606 that couples various system components including system memory 1604 to processing unit 1602. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computer 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1630, one or more application programs 1632, other program modules 1634, and program data 1636. Application programs 1632 or program modules 1634 may include, for example, computer program logic for implementing any one or more of (e.g., at least a portion of) the I/O-based attack detection logic 310, the feature derivation logic 314, the model usage logic 316, the feature-based classifier model 318, the comparison logic 320, the detection logic 322, the confidence determination logic 540, the entropy determination logic 542, the feature logic 544, the input difference logic 1152, the output difference logic 1154, the ratio determination logic 1156, the selection logic 1158, the feature logic 1144, the distance determination logic 1374, the value determination logic 1376, the feature logic 1344, the I/O-based attack detection logic 1510, the model usage logic 1516, the comparison logic 1520, the detection logic 1522, and/or the transformer-based model 1576, flowchart 200 (including any step of flowchart 200), flowchart 400 (including any step of flowchart 400), flowchart 600 (including any step of flowchart 600), flowchart 700 (including any step of flowchart 700), flowchart 800 (including any step of flowchart 800), flowchart 900 (including any step of flowchart 900), flowchart 1000 (including any step of flowchart 1000), flowchart 1200 (including any step of flowchart 1200), and/or flowchart 1400 (including any step of flowchart 1400), as described herein.

A user may enter commands and information into the computer 1600 through input devices such as keyboard 1638 and pointing device 1640. Other input devices (not shown) may include a microphone, joystick, game pad, satellite dish, scanner, touch screen, camera, accelerometer, gyroscope, or the like. These and other input devices are often connected to the processing unit 1602 through a serial port interface 1642 that is coupled to bus 1606, but may be connected by other interfaces, such as a parallel port, game port, or a universal serial bus (USB).

A display device 1644 (e.g., a monitor) is also connected to bus 1606 via an interface, such as a video adapter 1646. In addition to display device 1644, computer 1600 may include other peripheral output devices (not shown) such as speakers and printers.

Computer 1600 is connected to a network 1648 (e.g., the Internet) through a network interface or adapter 1650, a modem 1652, or other means for establishing communications over the network. Modem 1652, which may be internal or external, is connected to bus 1606 via serial port interface 1642.

As used herein, the terms "computer program medium" and "computer-readable storage medium" are used to generally refer to media (e.g., non-transitory media) such as the hard disk associated with hard disk drive 1614, removable magnetic disk 1618, removable optical disk 1622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650 or serial port interface 1642. Such computer programs, when executed or loaded by an application, enable computer 1600 to implement features of embodiments discussed herein. Accordingly, such computer programs represent controllers of the computer 1600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a processor system; and
a memory that stores computer-executable instructions that are executable by the processor system to at least:
use a transformer-based model to generate a vector, which summarizes a plurality of queries that are received by a hosted artificial intelligence system and a plurality of outputs that result from processing of the plurality of queries by the hosted artificial intelligence system, by providing a multivariate time series as an input to the transformer-based model, the multivariate time series including a plurality of elements, each element based at least on a pairwise distance between a numerical representation of a respective query of the plurality of queries and a numerical representation of a previous query that temporally precedes the respective query and further based at least on one or more attributes of a respective output that results from processing the respective query;
determine whether a distance between the vector and a point corresponding to a reference vector that is associated with a known type of algorithmic attack is less than or equal to a distance threshold; and
detect an algorithmic attack based at least on the distance between the vector and the point being less than or equal to the distance threshold.

2. The system of claim 1, wherein the vector includes a plurality of classifications among which the plurality of outputs are classified and a plurality of confidence values associated with the plurality of classifications, wherein each confidence value is based on a confidence of a respective classification of each output in the respective classification; and
wherein the one or more attributes of each output comprise a confidence in the respective output.

3. The system of claim 1, wherein the vector includes a plurality of classifications among which the plurality of outputs are classified and a plurality of confidences associated with the plurality of classifications; and
wherein the one or more attributes of each output comprise an entropy associated with a respective plurality of potential outputs, which are associated with the respective query, from which the respective output is selected.

4. The system of claim 1, wherein the one or more attributes of each output comprise a standard deviation associated with a distribution of the respective plurality of potential outputs, which are associated with the respective query, from which the respective output is selected.

5. The system of claim 1, wherein the numerical representation of each query of the plurality of queries includes a locality-sensitive hash of the respective query.

6. The system of claim 5, wherein each locality-sensitive hash includes a Gaussian sketch of the respective query.

7. The system of claim 1, wherein each element is based at least on a first pairwise distance between the numerical representation of the respective query of the plurality of queries and a numerical representation of a previous query that most recently temporally precedes the respective query and is further based at least on a second pairwise distance between the numerical representation of the respective query and a numerical representation of a previous query that is a temporally first query in a user session that is defined by the plurality of queries.

8. The system of claim 1, wherein the computer-executable instructions are executable by the processor system to at least:
determine whether the distance between the vector and the point, which corresponds to a centroid of a plurality of reference vectors that are associated with the known type of algorithmic attack, is less than or equal to a distance threshold.

9. The system of claim 8, wherein the distance threshold is defined by a radius that extends from the centroid to define a circle that includes the plurality of reference vectors and that includes no other vectors generated by the transformer-based model.

10. The system of claim 1, wherein the computer-executable instructions are executable by the processor system to at least:
detect that the algorithmic attack is of the known type based at least on the distance between the vector and the point, which corresponds to the reference vector that is associated with the known type of algorithmic attack, being less than or equal to the distance threshold.

11. A method implemented by a computing system, the method comprising:
using a transformer-based model to generate a vector, which summarizes a plurality of queries that are received by a hosted artificial intelligence system and a plurality of outputs that result from processing of the plurality of queries by the hosted artificial intelligence system, by providing a multivariate time series as an input to the transformer-based model, the multivariate time series including a plurality of elements, each element based at least on a pairwise distance between a numerical representation of a respective query of the plurality of queries and a numerical representation of a previous query that temporally precedes the respective query and further based at least on one or more attributes of a respective output that results from processing the respective query;
determining whether a distance between the vector and a point corresponding to a reference vector that is associated with a known type of algorithmic attack is less than or equal to a distance threshold; and
detecting an algorithmic attack based at least on the distance between the vector and the point being less than or equal to the distance threshold.

12. The method of claim 11, wherein the vector includes a plurality of classifications among which the plurality of outputs are classified and a plurality of confidence values associated with the plurality of classifications, wherein each confidence value is based on a confidence of a respective classification of each output in the respective classification; and
wherein the one or more attributes of each output comprise a confidence in the respective output.

13. The method of claim 11, wherein the vector includes a plurality of classifications among which the plurality of outputs are classified and a plurality of confidences associated with the plurality of classifications; and
wherein the one or more attributes of each output comprise an entropy associated with a respective plurality of potential outputs, which are associated with the respective query, from which the respective output is selected.

14. The method of claim 11, wherein the one or more attributes of each output comprise a standard deviation associated with a distribution of the respective plurality of potential outputs, which are associated with the respective query, from which the respective output is selected.

15. The method of claim 11, wherein the numerical representation of each query of the plurality of queries includes a locality-sensitive hash of the respective query.

16. The method of claim 11, wherein each element is based at least on a first pairwise distance between the numerical representation of the respective query of the plurality of queries and a numerical representation of a previous query that most recently temporally precedes the respective query and is further based at least on a second pairwise distance between the numerical representation of the respective query and a numerical representation of a previous query that is a temporally first query in a user session that is defined by the plurality of queries.

17. The method of claim 11, wherein determining whether the distance between the vector and the point is less than or equal to the distance threshold comprises:
   determining whether the distance between the vector and the point, which corresponds to a centroid of a plurality of reference vectors that are associated with the known type of algorithmic attack, is less than or equal to a distance threshold.

18. The method of claim 17, wherein the distance threshold is defined by a radius that extends from the centroid to define a circle that includes the plurality of reference vectors and that includes no other vectors generated by the transformer-based model.

19. The method of claim 11, wherein the plurality of queries are associated with a common user session.

20. A computer program product comprising a computer-readable storage medium having instructions recorded thereon for enabling a processor-based system to perform operations, the operations comprising:
   using a transformer-based model to generate a vector, which summarizes a plurality of queries that are received by a hosted artificial intelligence system and a plurality of outputs that result from processing of the plurality of queries by the hosted artificial intelligence system, by providing a multivariate time series as an input to the transformer-based model, the multivariate time series including a plurality of elements, each element based at least on a pairwise distance between a numerical representation of a respective query of the plurality of queries and a numerical representation of a previous query that temporally precedes the respective query and further based at least on one or more attributes of a respective output that results from processing the respective query;
   determining whether a distance between the vector and a point corresponding to a reference vector that is associated with a known type of algorithmic attack is less than or equal to a distance threshold; and
   detecting an algorithmic attack based at least on the distance between the vector and the point being less than or equal to the distance threshold.

* * * * *